United States Patent
Sato

(10) Patent No.: US 9,521,080 B2
(45) Date of Patent: Dec. 13, 2016

(54) METHOD OF CONTROLLING CONGESTION, APPARATUS FOR CONTROLLING CONGESTION AND COMMUNICATION SYSTEM

(71) Applicant: FUJITSU LIMITED, Kawasaki-shi, Kanagawa (JP)

(72) Inventor: Masahiro Sato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 180 days.

(21) Appl. No.: 14/492,380

(22) Filed: Sep. 22, 2014

(65) Prior Publication Data

US 2015/0009817 A1    Jan. 8, 2015

Related U.S. Application Data

(63) Continuation of application No. PCT/JP2012/057508, filed on Mar. 23, 2012.

(51) Int. Cl.
*H04L 12/26* (2006.01)
*H04L 12/801* (2013.01)
(Continued)

(52) U.S. Cl.
CPC .............. *H04L 47/193* (2013.01); *H04L 47/25* (2013.01); *H04L 47/11* (2013.01); *H04L 47/12* (2013.01); *H04L 47/225* (2013.01)

(58) Field of Classification Search
None
See application file for complete search history.

(56) References Cited

U.S. PATENT DOCUMENTS 6,233,224 B1    5/2001 Yamashita et al.
6,490,251 B2 *  12/2002 Yin ..................... H04L 12/5602
                                                    370/236.1
(Continued)

FOREIGN PATENT DOCUMENTS

JP     9-205461     8/1997
JP     11-98219     4/1999
(Continued)

OTHER PUBLICATIONS

"Virtual Bridged Local Area Networks—Amendment 7: Congestion Notification", IEEE P802.1Qau/D2.0: Draft Standard for Local and Metropolitan Area Networks; 2009, pp. i-xv, 1-102.
(Continued)

*Primary Examiner* — Michael J Moore, Jr.
(74) *Attorney, Agent, or Firm* — Staas & Halsey LLP

(57) ABSTRACT

Provided herein is a method of controlling a congestion in a communication scheme using a lower layer that performs a first congestion control and an upper layer that performs a second congestion control different from the first congestion control. The method includes detecting a congestion in the lower layer, notifying, from the lower layer to upper layer, the occurrence of the congestion and congestion control information related to the congestion; and setting, in the upper layer, an output rate for each of at least one congestion-related upper-layer session that is processed in the upper layer and is related to the congestion. Also provided is an apparatus for controlling congestion, a communication system, and a non-transitory computer-readable recording medium having stored therein a congestion control program.

16 Claims, 22 Drawing Sheets

(51) Int. Cl.
*H04L 12/825* (2013.01)
*H04L 12/815* (2013.01)

(56) References Cited

U.S. PATENT DOCUMENTS

| | | | |
|---|---|---|---|
| 7,730,201 B1* | 6/2010 | McAllister | H04L 12/5602 709/233 |
| 8,995,265 B2* | 3/2015 | Basso | H04L 47/56 370/232 |
| 2002/0075895 A1 | 6/2002 | Yamaguchi et al. | |
| 2010/0157803 A1* | 6/2010 | Rivers | H04L 47/10 370/235 |
| 2012/0063316 A1* | 3/2012 | Ghanwani | H04L 47/10 370/235 |
| 2012/0147748 A1* | 6/2012 | Sato | H04L 47/12 370/235 |
| 2012/0250511 A1* | 10/2012 | Neeser | H04L 47/12 370/235 |
| 2013/0194946 A1* | 8/2013 | Basso | H04L 47/56 370/252 |
| 2013/0205039 A1* | 8/2013 | Casimer | H04L 47/11 709/235 |

FOREIGN PATENT DOCUMENTS

| | | |
|---|---|---|
| JP | 2000-253096 | 9/2000 |
| JP | 2001-168871 | 6/2001 |
| JP | 2002-204255 | 7/2002 |

OTHER PUBLICATIONS

International Search Report of PCT/JP2012/057508 mailed May 29, 2012.
Office Action dated Feb. 23, 2016 in corresponding Japanese Patent Application No. 2014-505929.

* cited by examiner

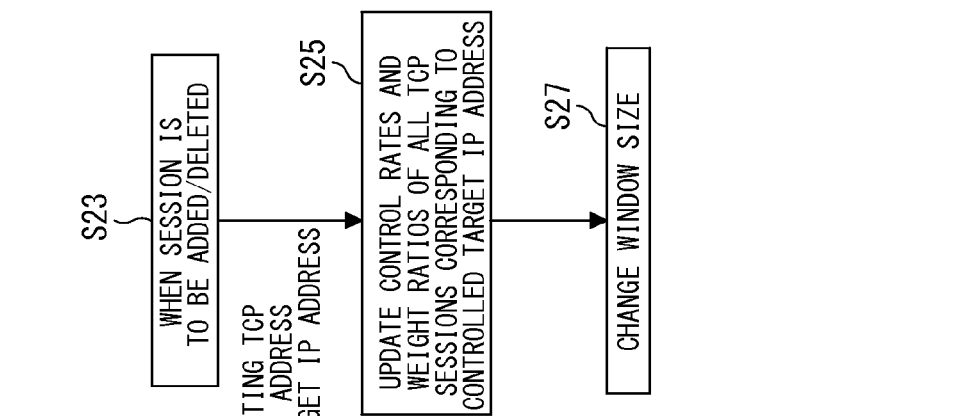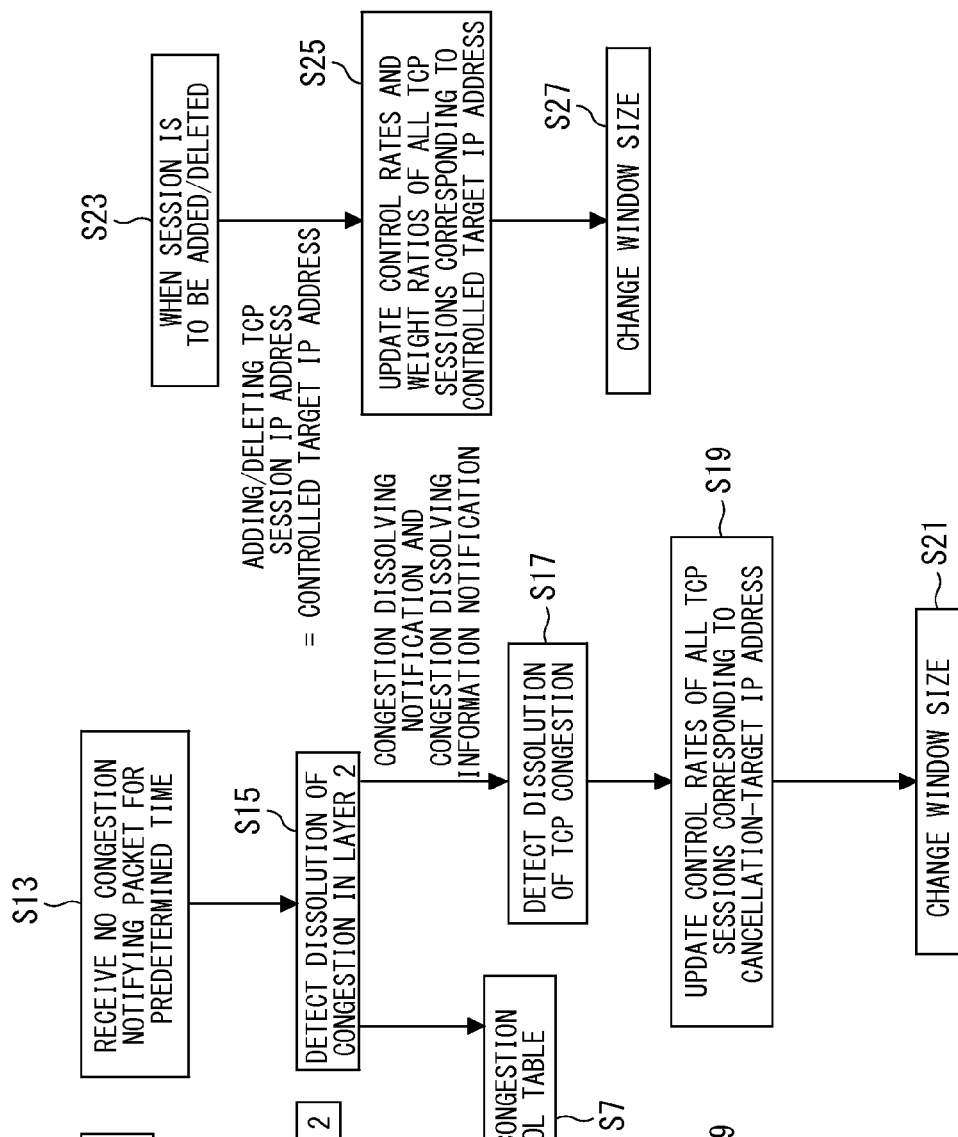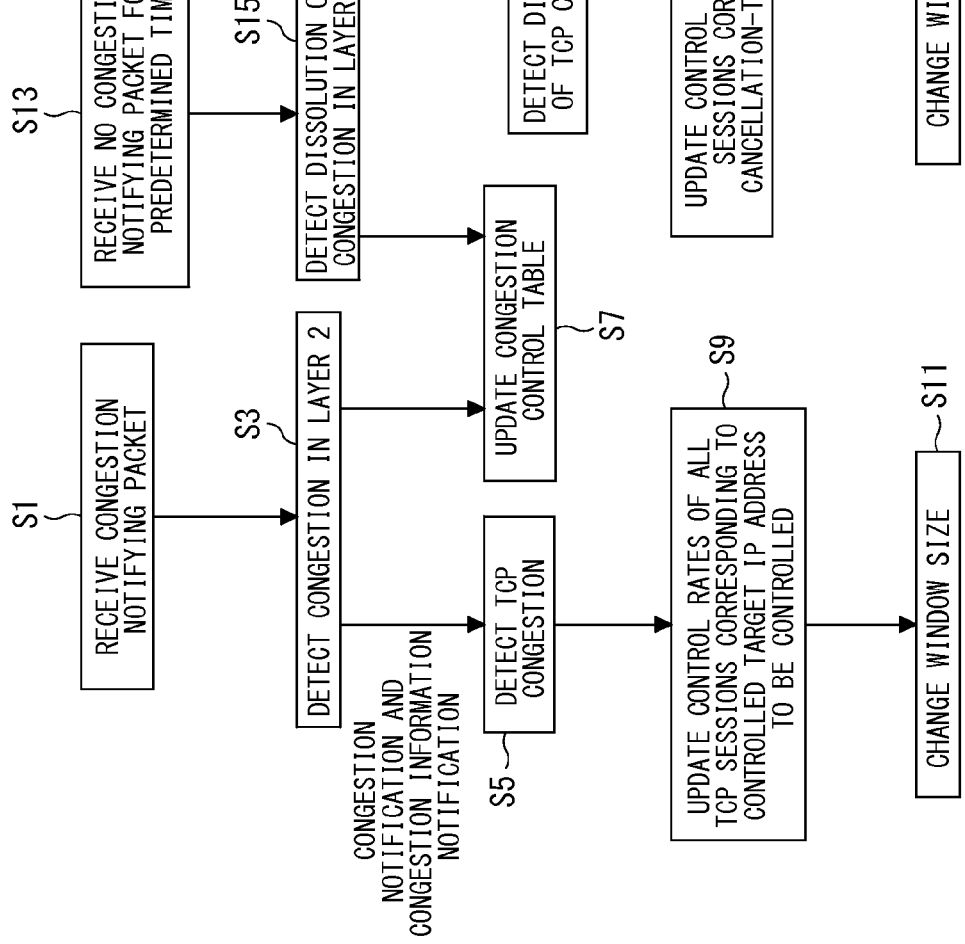

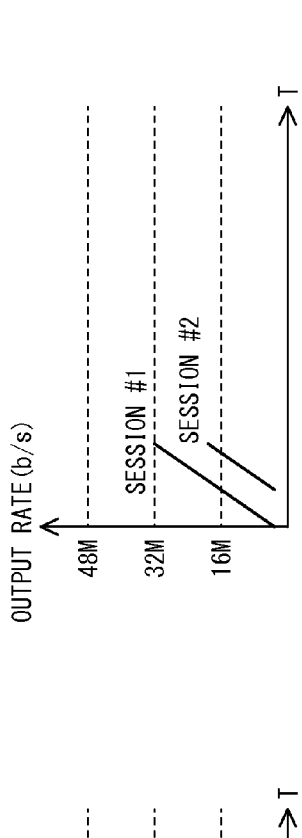
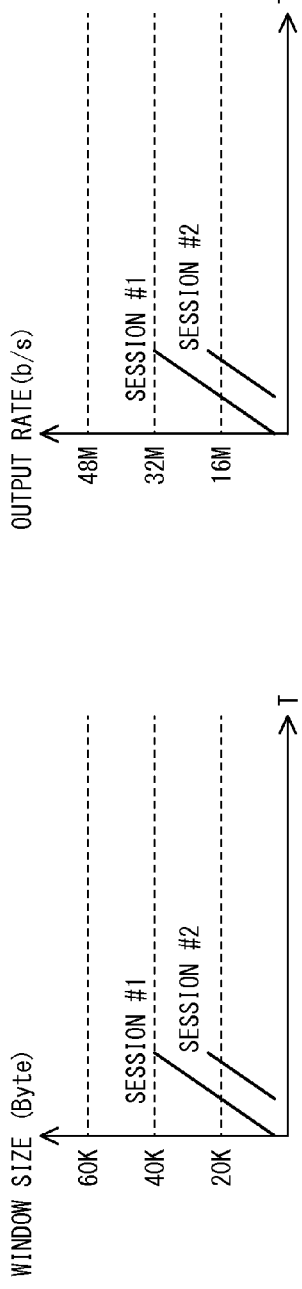
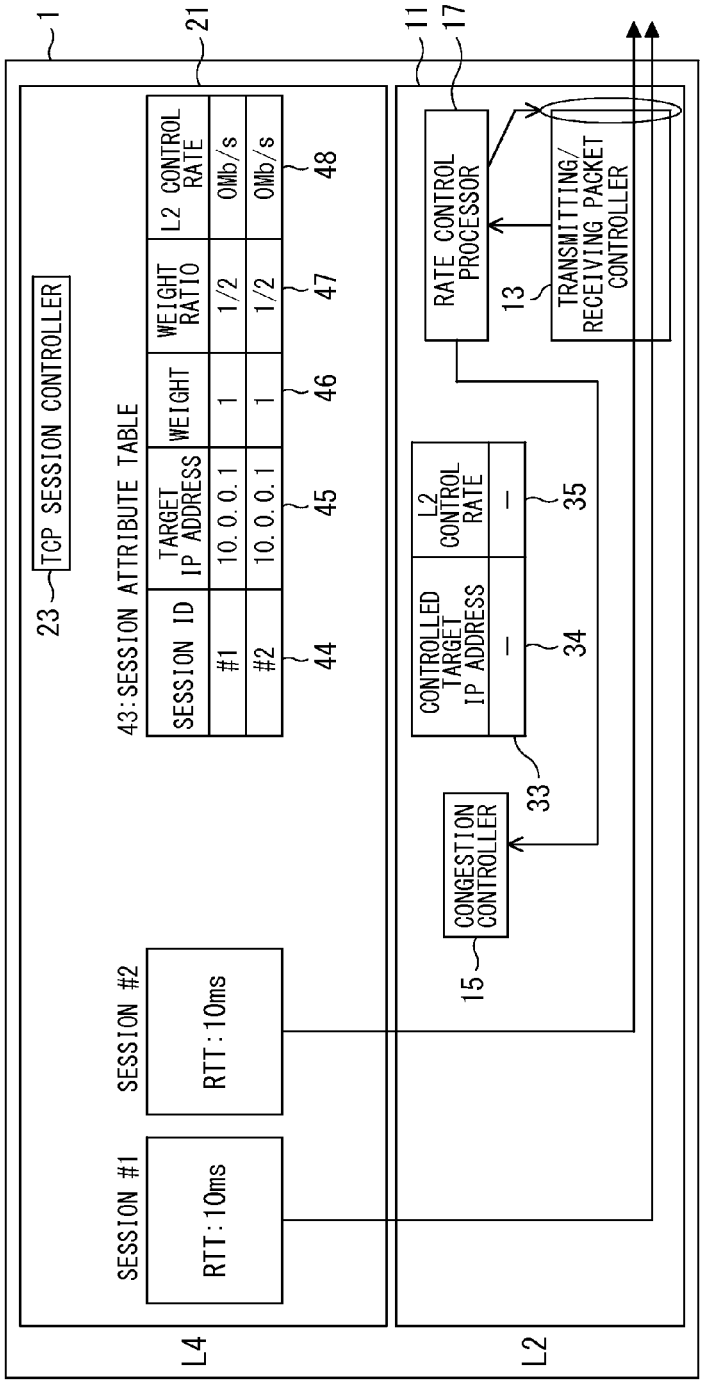

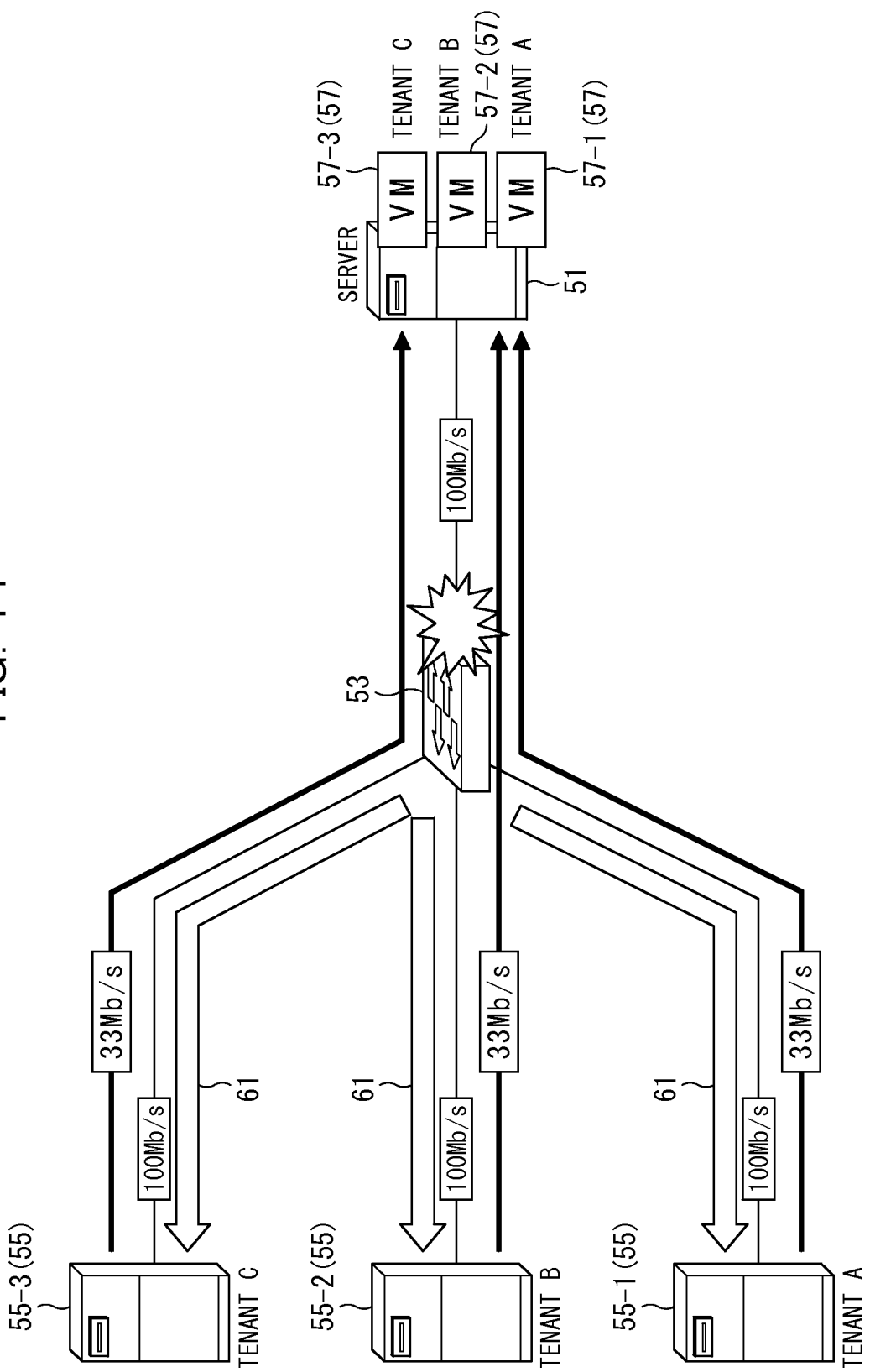

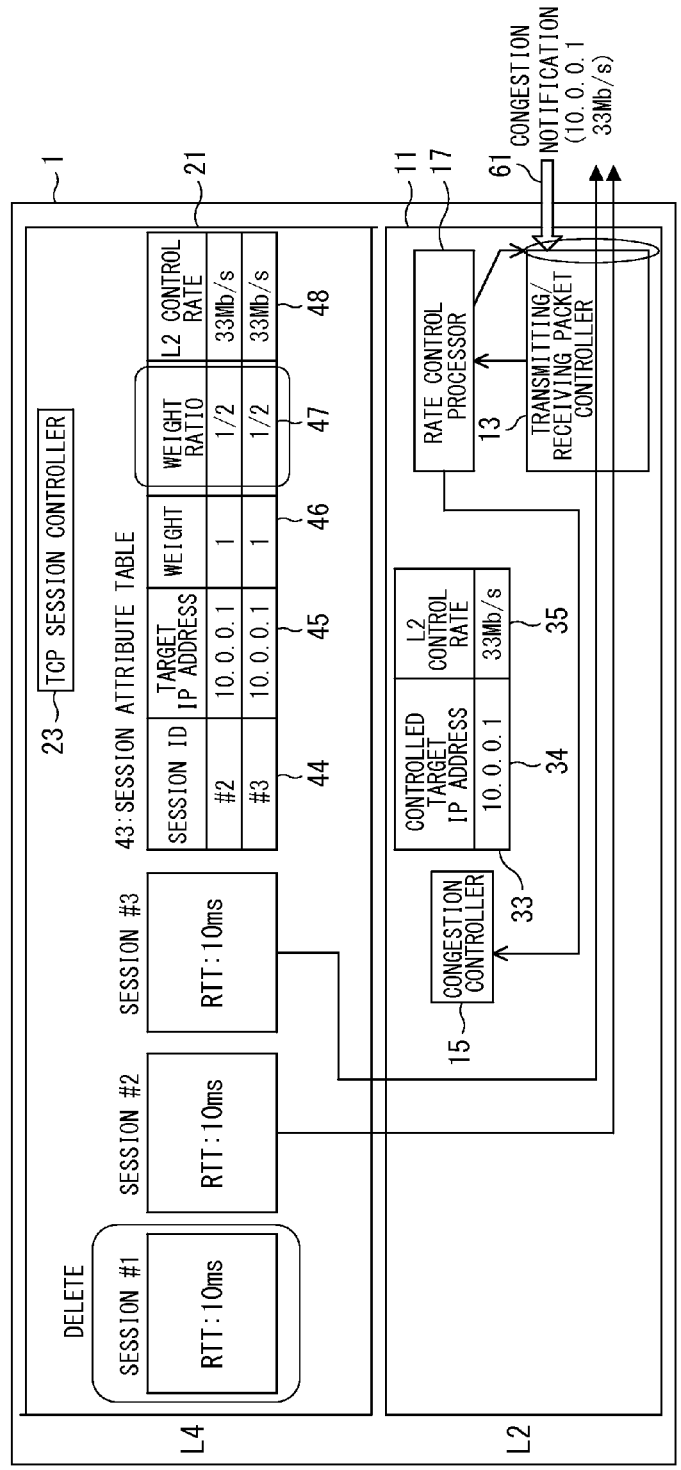

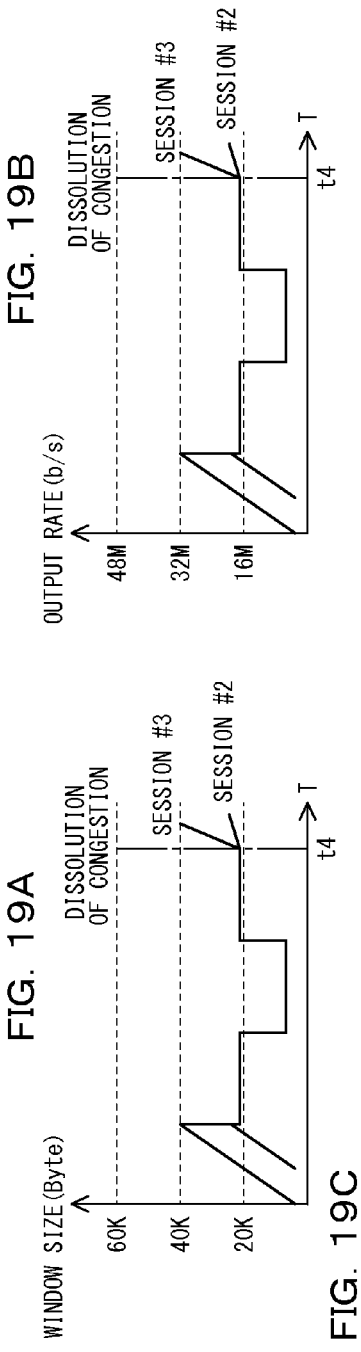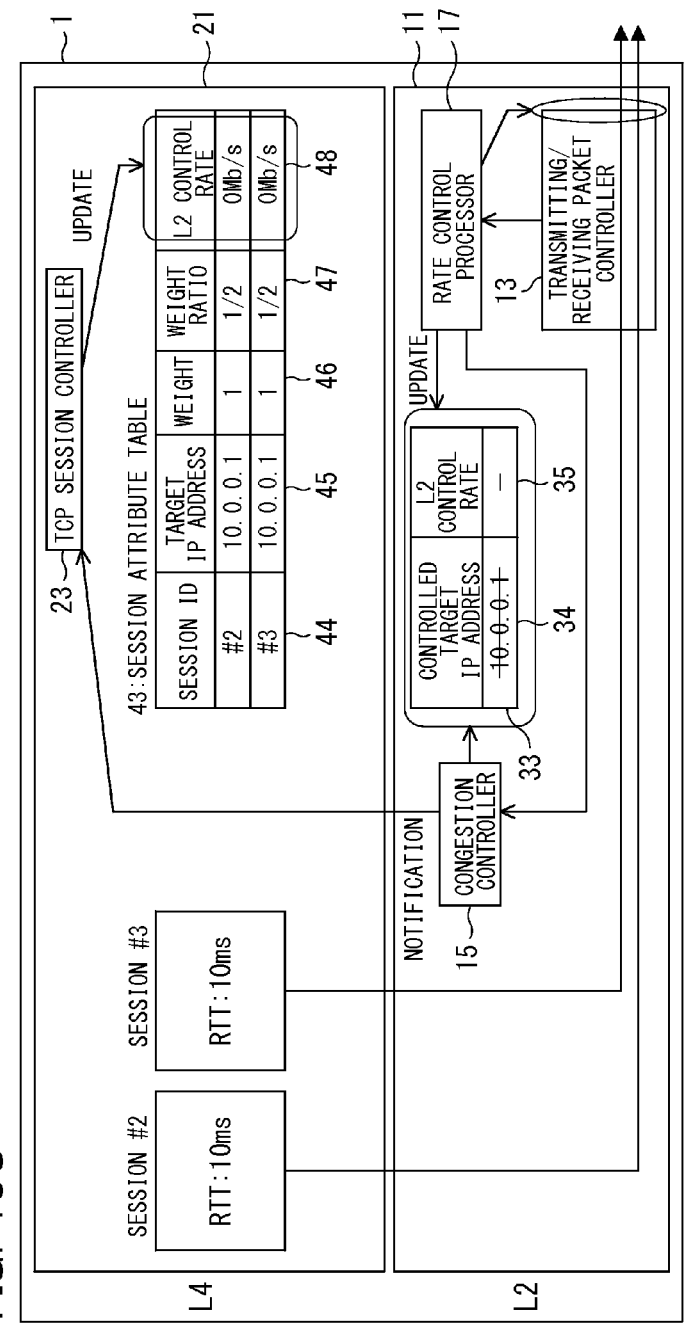

METHOD OF CONTROLLING CONGESTION, APPARATUS FOR CONTROLLING CONGESTION AND COMMUNICATION SYSTEM

CROSS-REFERENCE TO RELATED APPLICATION

This application is a continuation application of International Application PCT/JP2012/057508 filed on Mar. 23, 2012 and designated the U.S., the entire contents of which are incorporated herein by reference.

FIELD

The embodiment discussed herein is a method of controlling a congestion, an apparatus for controlling congestion and a communication system.

BACKGROUND

In a cloud data center, multiple tenants (e.g., applications and information processing apparatuses) share the same network resources, and quality control among such multiple tenants is important. One of the quality control issues is to control possible congestion. Congestion control is standardized in, for example, IEEE802.1Qau Congestion Notification Draft 2.0 (hereinafter, referred to as IEEE802.1Qau).

FIG. 20 schematically illustrates congestion control in accordance with IEEE802.1Qau.

In FIG. 20, a server 101 is connected to an information processing apparatus (tenant) 105 via a switch 103. As indicated by the rightward thick-line arrow, the tenant 105 is transmitting packets to the server 101.

Under this state, upon an occurrence of a congestion in Layer 2, which is the lower layer, the switch 103 transmits a congestion notifying packet 161 to an information processing apparatus (tenant) 105, which is the transmission source node, as illustrated by the leftward white arrow in accordance with IEEE802.1Qau. This congestion notifying packet includes a target IP (Internet Protocol) address of a target whose output rate is to be controlled (hereinafter the address is referred to as a "target IP address") and an L2 control rate. Hereinafter, a target IP addresses and an L2 control rates are collectively referred to as "congestion control information". An L2 control rate is the upper limit of output rate from each transmission source node to a target IP address, and is calculated by the switch 103 to dissolve the congestion. Upon receipt of the congestion notifying packet 161, the transmission source node 105 control its output rate and consequently, the congestion abates.

Specifically, a transmission source node controls output rates by distinguishing an output queue of a flow that affects congestion from an output queue of a flow that does not affect the congestion and then controlling only the rate of the flow that affects the congestion and not controlling the rate of the flow that does not affect the congestion.

In the configuration of FIG. 20, upon an occurrence of a congestion in the communication traffic complying with Transmission Control Protocol communication, the TCP layer (Layer 4), which is the upper layer, performs congestion control independently of congestion control in Layer 2.

When packets having the same sequence number are received or expiration of the TCP retransmission timer is detected, TCP determines that congestion is occurring. In these case, an L4 processor 121 (see FIG. 22) controls the congestion by reducing a window size and thereby controlling an output rate. This congestion control is performed in unit of TCP session.

FIG. 21 is a diagram schematically illustrating control of a window size via TCP. When congestion occurs at time point t11, the Layer 4 (L4) processor 121 that is provided in the information processing apparatus 105 and that processes Layer 4 reduces the window sizes of TCP sessions #1 and #2. Then, when the congestion is dissolved at time point t12, the L4 processor 121 increases the window sizes of TCP sessions #1 and #2. When another congestion occurs at time point t13, the L4 processor 121 reduces the window sizes of TCP sessions #1 and #2.

As described above, upon an occurrence of a congestion under a state where the communication traffic complies with TCP and Layer 2 also performs the congestion control defined in IEEE802.1Qau, both Layer 2 and Layer 4 carry-out congestion control as illustrated in FIG. 22. The congestion control of Layer 2 is performed independently of the congestion control of Layer 4.

FIGS. 22A and 22B are diagrams schematically illustrating congestion controls performed in Layer 2 and Layer 4 independently of each other. FIG. 22A depicts an output rate; and FIG. 22B depicts a congestion control.

As illustrated in FIG. 22B, the information processing apparatus 105 includes an Layer 2 (L2) processor 111 that processes Layer 2 and the L4 processor 121 that processes Layer 4.

When congestion occurs, the congestion of Layer 2 is detected first and a rate controller 117 of the L2 processor performs rate control. On the other hand, not having detected the congestion by that time, the L4 processor 121 does not start the congestion control yet.

For the above, a time delay as illustrated in the graph of FIG. 22A arises until the control of the output rate of Layer 4 after the start of congestion control of Layer 2. This causes Layer 4 to output packets from Layer 4 at a transmission rate higher than the communicable rate of L2 until the output rate of Layer 4 has been controlled. Consequently, packet loss of Layer 2 occurs.

SUMMARY

In an aspect, there is provided a method of controlling a congestion in a communication scheme using a lower layer that performs a first congestion control and an upper layer that performs a second congestion control different from the first congestion control, the method comprising: detecting a congestion in the lower layer; notifying, from the lower layer to upper layer, the occurrence of the congestion and congestion control information related to the congestion; and setting, in the upper layer, an output rate for each of at least one congestion-related upper-layer session that is processed in the upper layer and is related to the congestion.

In another aspect, there is provided an apparatus for controlling congestion in a communication scheme using a lower layer that performs a first congestion control and an upper layer that performs a second congestion control different from the first congestion control, the apparatus comprising: a detector that detects a congestion in the lower layer; a notifier that notifies, from the lower layer to upper layer, the occurrence of the congestion and congestion control information related to the congestion; and a processor that sets, in the upper layer, an output rate for each of at least one congestion-related upper-layer session that is processed in the upper layer and is related to the congestion.

In a further aspect, there is provided a system comprising an information processing apparatus and a host apparatus that are connected to each other via a delay apparatus, the system communicating in a communication scheme using a lower layer that performs a first congestion control and an upper layer that performs a second congestion control different from the first congestion control, the information processing apparatus comprising: a detector that detects a congestion in the lower layer; a notifier that notifies, from the lower layer to upper layer, the occurrence of the congestion and congestion control information related to the congestion; and a processor that sets, in the upper layer, an output rate for each of at least one congestion-related upper-layer session that is processed in the upper layer and is related to the congestion.

In a further aspect, there is provided a non-transitory computer-readable recording medium having stored therein, a congestion control program in a communication scheme using a lower layer that performs a first congestion control and an upper layer that performs a second congestion control different from the first congestion control, the program causing the computer to: detect a congestion in the lower layer; notify, from the lower layer to upper layer, the occurrence of the congestion and congestion control information related to the congestion; and set, in the upper layer, an output rate for each of at least one congestion-related upper-layer session that is processed in the upper layer and is related to the congestion.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 10A-10C are flow charts illustrating a succession of procedural steps performed by a congestion control apparatus of an example of the first embodiment, wherein FIG. 10A illustrates a flow upon an occurrence of a congestion; FIG. 10B illustrates a flow upon dissolution of the congestion; and FIG. 10C illustrates a flow when a TCP session is added or deleted;

FIGS. 12A-12C are diagrams schematically illustrating a process under the state of FIG. 11, wherein FIG. 12A indicates a window size; FIG. 12B indicates output rates; and FIG. 12C indicates a congestion control apparatus;

FIG. 14 is a diagram schematically illustrating the exemplary network configuration in FIG. 3 after notification of the congestion;

FIG. 15B indicates output rates; and FIG. 15C indicates a congestion control apparatus;

FIG. 16B indicates output rates; and FIG. 16C indicates a congestion control apparatus;

FIGS. 17A-17C are diagrams schematically illustrating a congestion control when a TCP session is deleted in the exemplary network configuration in FIG. 3, wherein FIG. 17A indicates a window size; FIG. 17B indicates output rates; and FIG. 17C indicates a congestion control apparatus;

FIGS. 19A-19C are diagrams schematically illustrating a process in the example of the process of FIG. 18, wherein FIG. 19A indicates a window size; FIG. 19B indicates output rates; and FIG. 19C indicates a congestion control apparatus;

FIG. 22B represents a congestion control.

DESCRIPTION OF EMBODIMENTS

Hereinafter, a first embodiment of the present invention will be described with reference to the accompanying drawings.

(A) Configuration

Firstly, the configuration of a congestion control apparatus 1 (an apparatus for controlling congestion) according to an example of the first embodiment will be described.

Figure 1:
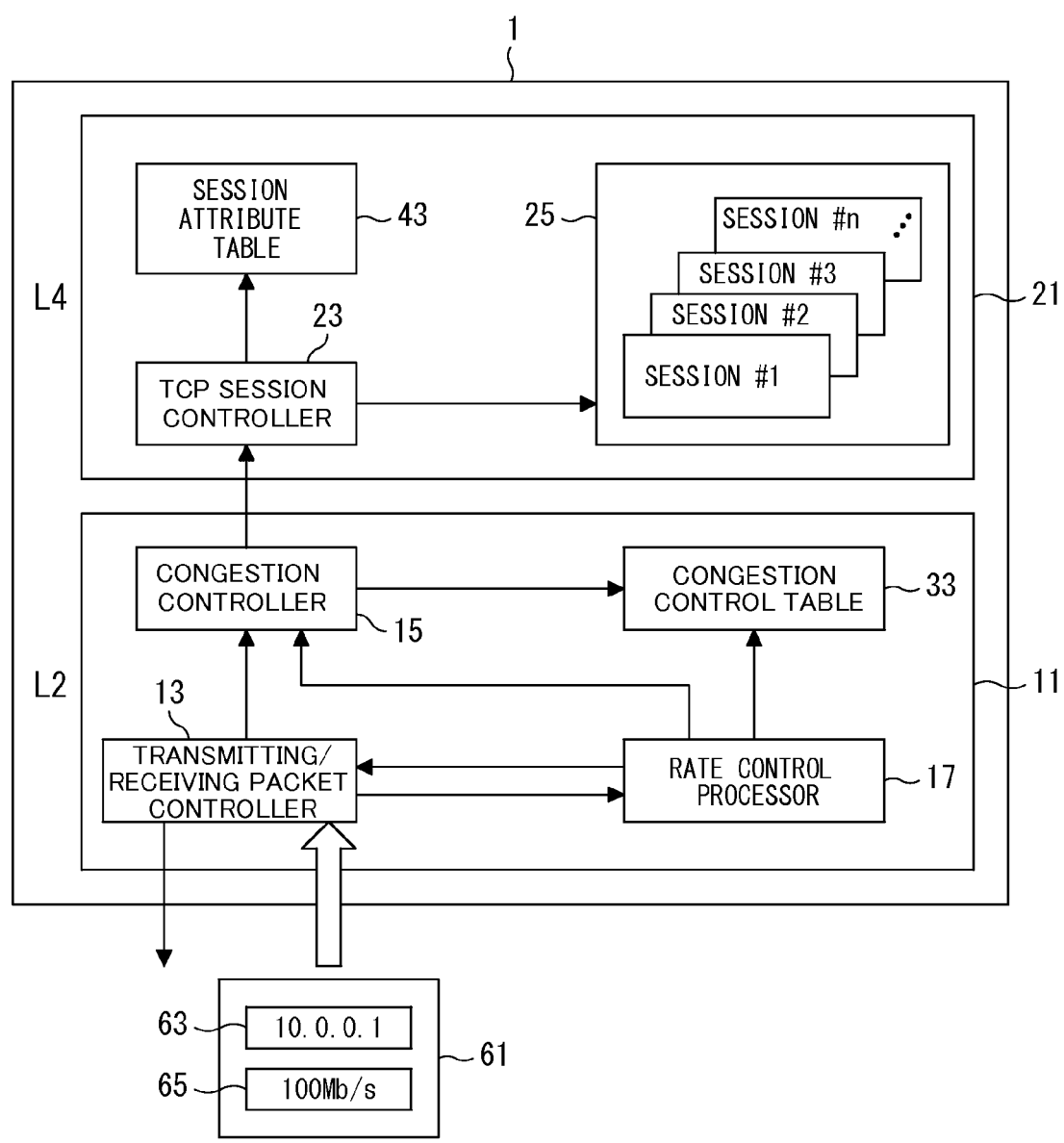
FIG. 1 is a diagram schematically illustrating the functional configuration of a congestion control apparatus according to an example of a first embodiment.

FIG. 1 is a diagram schematically illustrating the functional configuration of the congestion control apparatus 1 according to an example of the first embodiment.

Figure 2:
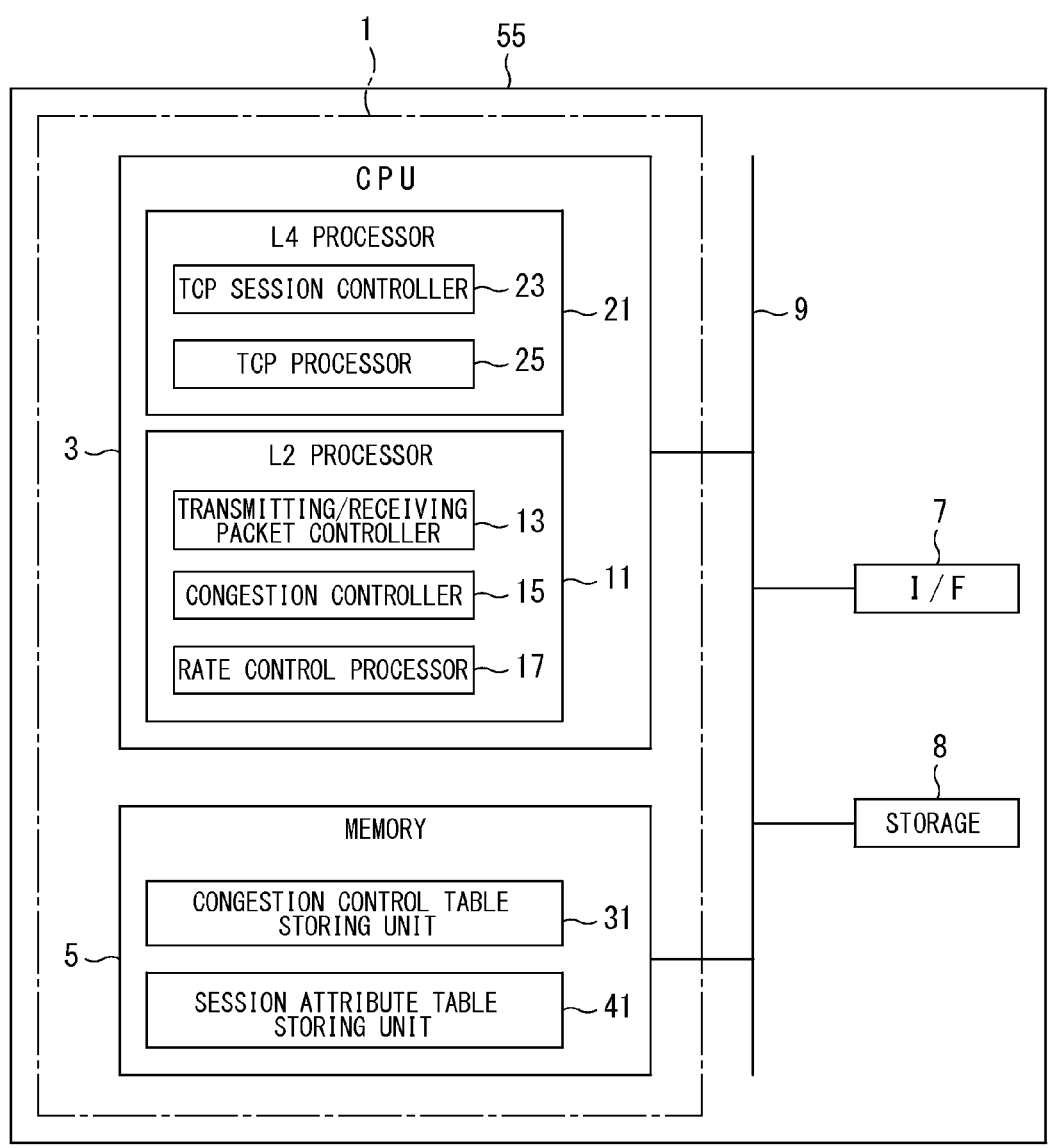
FIG. 2 is a diagram schematically illustrating the hardware configuration of a congestion control apparatus according to an example of the first embodiment.

The congestion control apparatus 1 is provided in, for example, an information processing apparatus 55 (see FIG. 2).

The congestion control apparatus 1 includes an L2 processor 11 and an L4 processor 21.

The L2 processor 11 (also indicated by "L2" in the drawings) performs a congestion process related to Layer 2 (lower layer). The L2 processor 11 receives a congestion notifying packet 61 from a switch 53 (see FIG. 3). In a congestion notifying packet 61, the IP address 63 (hereinafter called a "target IP address" of a target whose output rate is to be controlled and an L2 control rate 65 are described. An L2 control rate is calculated by the switch 53 and is an upper limit of a rate at which each transmission source node outputs packets to a target IP address 63 to dissolve the congestion Upon receipt of the congestion notifying packet 61, the L2 processor 11 performs congestion control of Layer 2 conforming to the IEEE802.1Qau and also notifies the L4 processor 21 that is to be detailed below of the occurrence of congestion. At that time, the L2 processor 11 notifies the L4 processor 21 of a target IP address 63 and also of an L2 control rate 65 as rate controlling information.

The L2 processor 11 includes a transmitting/receiving packet controller 13, a congestion controller (notifier) 15, a rate control processor (detector) 17, and a congestion control table 33.

The transmitting/receiving packet controller 13 controls transmitting and receiving packets between the information processing apparatus 55 and an external device.

When the rate control processor 17 that is to be detailed below receives a congestion notifying packet 61 from the switch 53 (see FIG. 3), the congestion controller 15 detects an occurrence of congestion in Layer 2. Then the congestion controller 15 notifies a TCP session controller 23 in the L4 processor 21 of the occurrence of the congestion. Specifically, the congestion controller 15 notifies the TCP session controller 23 of the target IP address 63 and the L2 control rate 65, which serves as rate controlling information.

Figure 5:
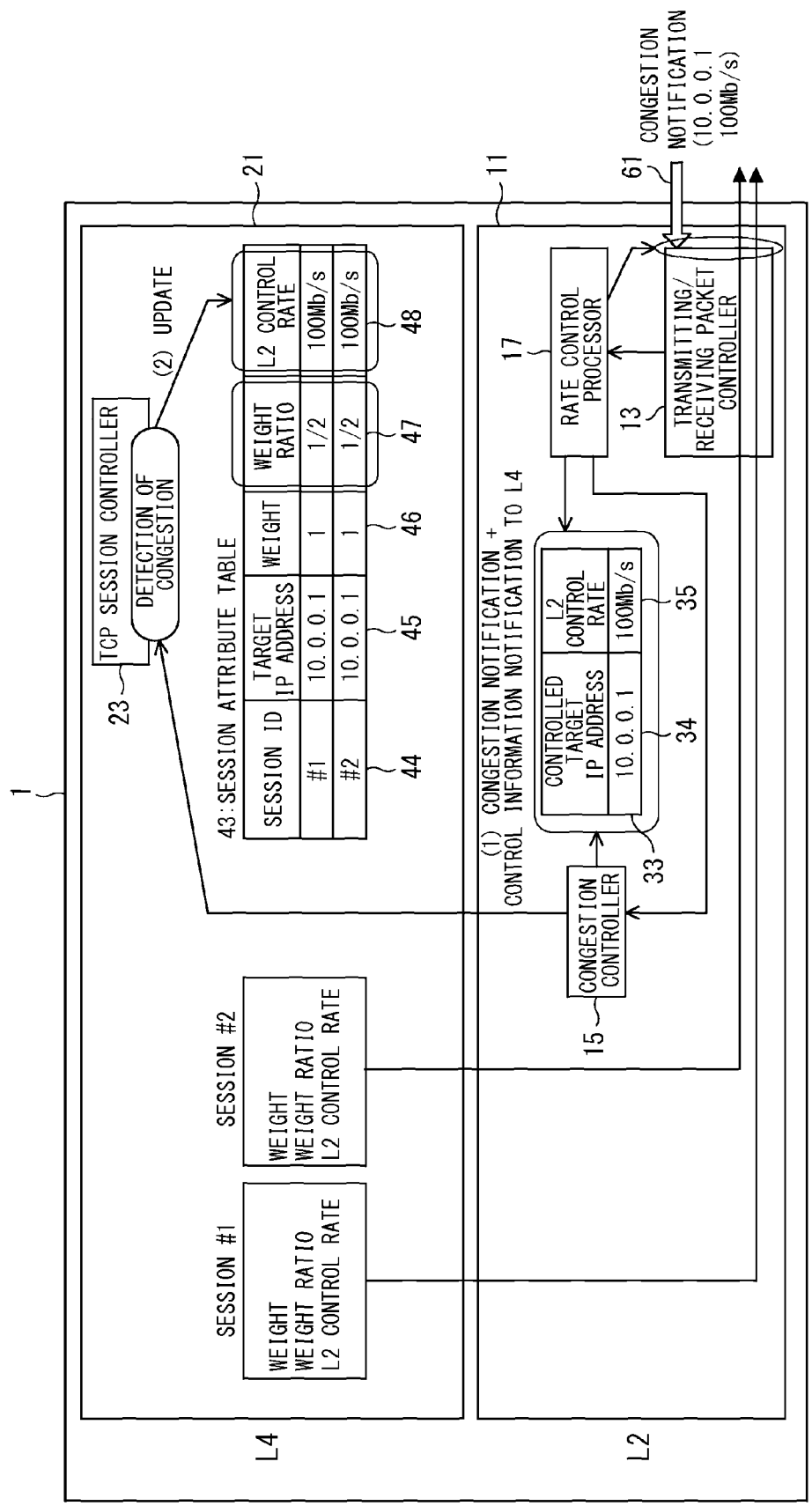
FIG. 5 is a diagram schematically illustrating operation performed by a congestion control apparatus of an example of the first embodiment upon an occurrence of a congestion.

The rate control processor 17 writes the target IP address 63 and the L2 control rate 65 included in the congestion notifying packet 61 into the respective corresponding fields 34 and 35 of the congestion control table 33 (see FIG. 5).

In the event of dissolution the congestion, the switch 53 aborts transmission of a congestion notifying packet 61. On the basis of this, the congestion controller 15 determines that the congestion in Layer 2 has been dissolved if the congestion controller 15 has received no congestion notifying packet 61 from the switch 53 (see FIG. 3) for a predetermined period. In this case, the congestion controller 15 notifies the TCP session controller 23 in the L4 processor 21 of the dissolution of the congestion. At that time, the congestion controller 15 notifies the TCP session controller 23 of also the cancellation-target IP address.

After the congestion is dissolved, the rate control processor 17 updates the corresponding record in the congestion control table 33.

Upon receipt of the congestion notifying packet 61 from the switch 53 (see FIG. 3), the rate control processor 17 lowers an output rate from the transmitting/receiving packet controller 13 to a value that the L2 control rate 65 in the congestion notifying packet 61 notifies in obedience to IEEE802.1Qau, and thereby dissolves the congestion.

The congestion control table 33 is a table that stores information to be used for control of congestion occurred in Layer 2. As illustrated in FIG. 5, the congestion control table 33 includes fields for a controlled target IP address 34 and an L2 control rate 35.

The controlled target IP address 34 represents a target IP address that is to be subjected to rate control in L2 layer (i.e., Layer 2), and specifically stores therein the same as the value of the target IP address 63 included in the congestion notifying packet 61 transmitted from the switch 53.

The L2 control rate 35 is an upper limit of a rate at which each transmission source node is allowed to output packets to dissolve the congestion in L2 layer, and specifically stores therein the same as the L2 control rate 65 included in the congestion notifying packet 61 transmitted from the switch 53.

As illustrated in FIG. 1, the L4 processor 21 (also indicated by "L4" in the drawings) performs a congestion processing related to Layer 4 (upper layer). Before congestion control of the TCP standard starts, the L4 processor 21 reduces the window size of each TCP session in obedience to the notification from the L2 processor 11, and lowers the output rate from Layer 4 to inhibit packet loss caused by a time delay.

The L4 processor 21 includes a TCP session controller (controller) 23, a TCP processor (processor) 25, and a session attribute table (management table) 43.

In the event of an occurrence of congestion, the TCP session controller 23 updates the session attribute table 43 that is to be detailed below using the controlled target IP address and the rate controlling information that the congestion controller 15 of the L2 processor 11 notifies. Specifically, the TCP session controller 23 updates an L2 control rate 48 (see FIG. 4) in the session attribute table 43 that is to be detailed below using the rate controlling information that has been notified. Furthermore, the TCP session controller 23 calculates a weight ratio of each TCP session to the total weight of all the TCP sessions and records the calculated weight ratio into a weight ratio 47 of the session attribute table 43. The weight ratio will be detailed below.

The TCP processor 25 processes each TCP session. In the example of FIG. 1, the TCP processor 25 simultaneously executes multiple sessions #1 to #n (where n is a natural number of one or more). In the event of an occurrence of congestion in Layer 2, the TCP processor 25 reduces the window size of the each TCP session to inhibit packet loss, referring to the session attribute table 43. This process will be detailed below.

Figure 4:
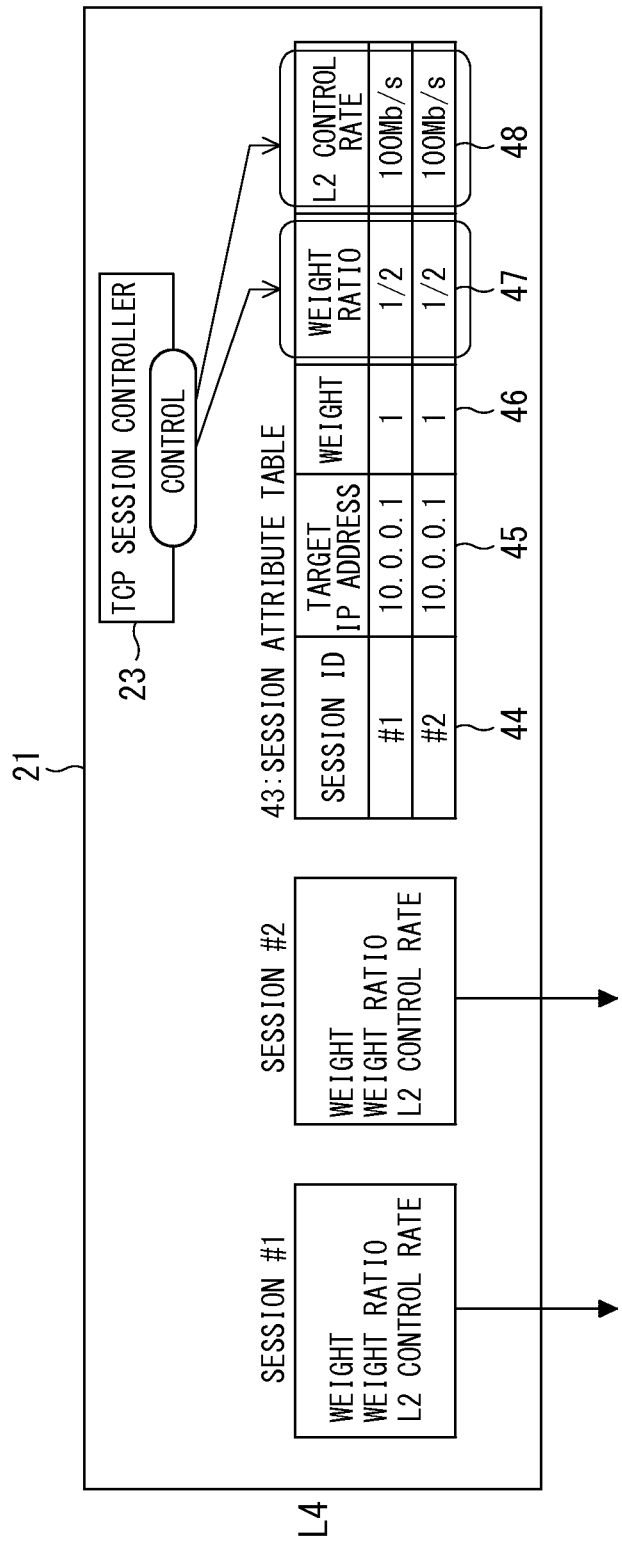
FIG. 4 is a diagram schematically illustrating an example of the configuration of an L4 processor of a congestion control apparatus of an example of the first embodiment.

The session attribute table 43 is a table that stores the attribute values of each TCP session. As illustrated in FIG. 4, the session attribute table 43 includes fields of a session ID 44, a target IP address 45, a weight 46, a weight ratio 47, and an L2 control rate 48.

The session ID 44 is a field that stores information to identify the TCP session. In the example of FIG. 4, the name of the TCP session is written into the session ID 44.

The target IP address 45 represents the target IP address of the TCP session.

As described above, the weight 46 is a setting value used to set a priority order of the TCP sessions. A higher value is set in the weight 46 of a TCP session that is given a higher priority. As described above, the default setting gives the same value to the weights 46 of all the TCP sessions.

The weight ratio 47 is a ratio of the weight 46 of each corresponding TCP session and is calculated from, for example, the expression below.

weight ratio=(weight of the corresponding TCP session)/(total weight of all the TCP sessions)

The L2 control rate 48 is a control rate of L2 layer and stores therein a value of the rate controlling information that the congestion controller 15 of the L2 processor 11 has notified.

In processing the TCP sessions #1 to #n, the TCP processor 25 calculates a window size and an output rate of each TCP session using the weight ratios 47 and the L2 control rates 48 in the session attribute table 43. For example, the TCP processor 25 calculates each window size and each output rate in the following expressions.

$$\text{window size} = (\text{output rate of TCP session}) \times (\text{Round Trip Time:RTT}) \quad (1)$$

$$\text{output rate of a TCP session} = (\text{control rate of Layer 2}) \times (\text{weight ratio}) \quad (2)$$

Here, RTT is a time that a single packet takes to make a round trip and is represented in unit of second (s).

For example, the default setting gives the same value to the weights 46 of all the TCP sessions in the session attribute table 43. Alternatively, the user or the like may set different values into the weights 46 of the TCP sessions, considering pre-determined setting (preset). The weights 46 of the respective TCP sessions may be dynamically determined on the basis of the ratios of the respective window sizes at the time of an occurrence of congestion.

FIG. 2 is a diagram schematically illustrating the hardware configuration of the congestion control apparatus 1 according to an example of the first embodiment.

As described above, the congestion control apparatus 1 of the example of the first embodiment is provided in, for example, the information processing apparatus 55.

The information processing apparatus 55 includes, for example, a Central Processing Unit (CPU) 3, a memory 5, an Interface (I/F) 7, a storage 8, and a bus 9.

The CPU 3 is a processor that reads a non-illustrated congestion controlling program from the memory 5 or the storage 8 to execute the process of the congestion control apparatus 1.

The memory 5 is a memory region that temporarily stores therein various pieces of data and programs to be used by the CPU 3 in performing calculations and controls. The memory 5 also functions as the congestion control table storing unit 31 that stores the congestion control table 33 and a session attribute table storing unit 41 that stores the session attribute table 43, the tables 33 and 43 being used by the congestion control apparatus 1. An example of the memory 5 includes a Random Access Memory (RAM) and a Read Only Memory (ROM).

The I/F 7 is an interface that is to be used for connecting the information processing apparatus 55 to an external device and is exemplified by a network I/F board.

For example, the storage 8 is a storage device that stores the Operating System of the information processing apparatus 55, programs, and various pieces of data. For example, the storage 8 may be a non-volatile memory such as a Hard Disk Drive (HDD) or a Solid State Drive (SSD), or another-type device.

The bus 9 is an interconnection bus that internally connects the CPU 3, the memory 5, the I/F 7, the storage 8, and other parts in the information processing apparatus 55 to one another.

Figure 3:
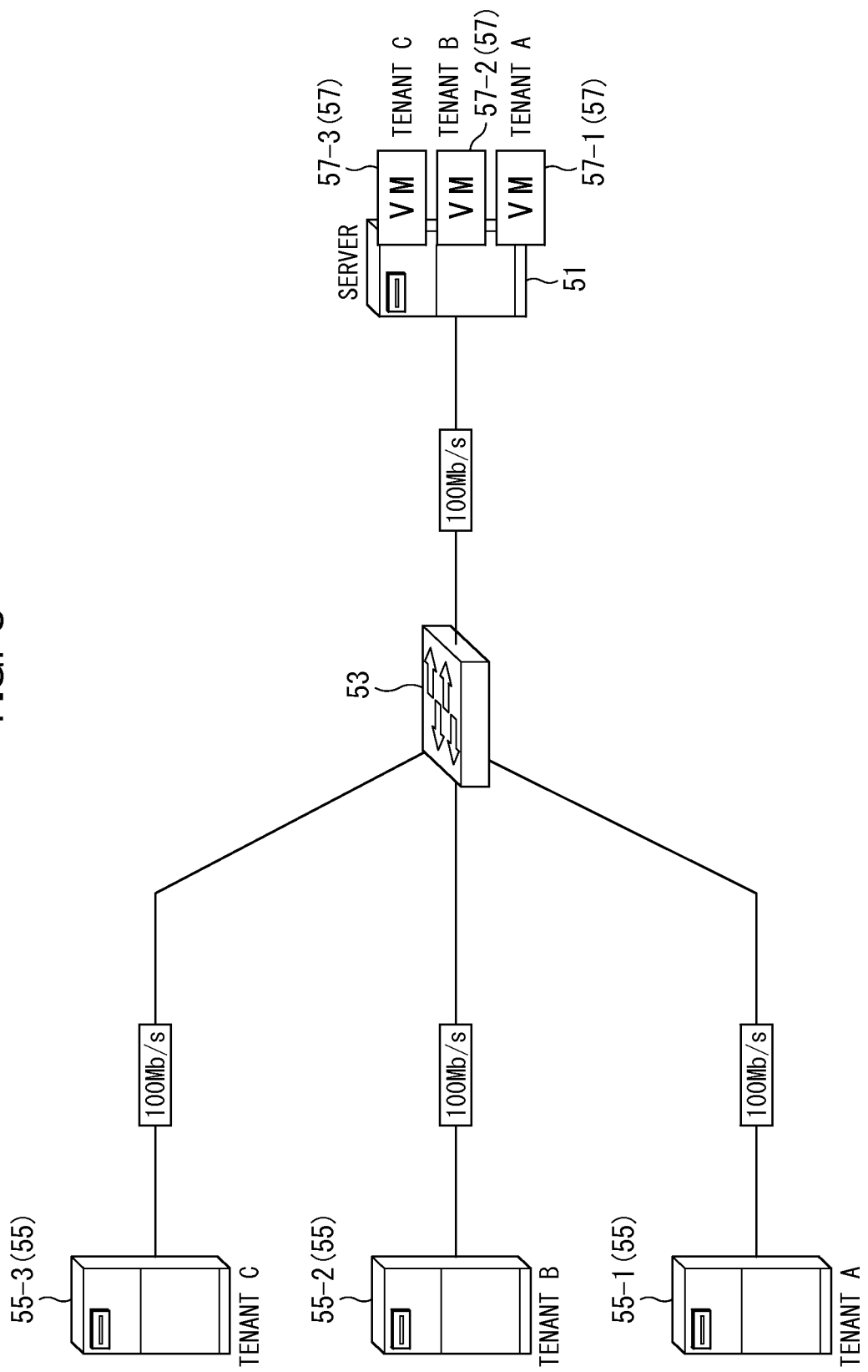
FIG. 3 is a diagram schematically illustrating an example of a network configuration that uses a congestion control apparatus of an example of the first embodiment.

FIG. 3 is a diagram schematically illustrating an exemplary network configuration that uses the congestion control apparatus 1 according to an example of the first embodiment;

As illustrated in FIG. 3, information processing apparatuses 55-1 to 55-3 (tenant A to C) each including the congestion control apparatus 1 are connected to a server 51 via a switch 53. With this configuration, the information processing apparatuses 55-1 to 55-3 are provided with service and environment by the server 51.

In the network configuration of FIG. 3, an example of the maximum rate between the server 51 and the switch 53 is 100 Mega bit per second (Mb/s) while an example of the maximum rate between the switch 53 and each of the information processing apparatuses 55-1 to 55-3 is 100 Mb/s.

The server 51 runs Virtual Machines (VMs) 57-1 to 57-3 associated with the tenants A to C, respectively, to provide service and the environment to the tenant A-C.

Hereinafter, one of the information processing apparatuses is specified by a reference number from 55-1 to 55-3 according to the requirement, but an arbitrary information processing apparatus is represented by a reference number 55.

Likewise, one of the VMs is specified by a reference number from 57-1 to 57-3 according to the requirement, but an arbitrary VM is represented by a reference number 57.

The switch 53 is compatible with the congestion control defined under IEEE802.1Qau, for example. In the event of detection of congestion in a specific link, the switch 53 issues congestion notification to the information processing apparatus 55 (congestion control apparatus 1) that is the transmission source of the specific link.

Next, description will now be made in relation to an L4 (TCP layer) processor 21 included in the congestion control apparatus 1 according to an example of the first embodiment.

FIG. 4 is a diagram schematically illustrating an example of the configuration of the L4 processor 21 included in the congestion control apparatus 1.

In the example of FIG. 4, a TCP processor 25 (see FIG. 1) in the L4 processor 21 is processing two TCP sessions, i.e., the TCP sessions #1 and #2.

Various values attribute to these TCP sessions #1 and #2 are set in the respective fields of the session attribute table 43.

In the session attribute table 43, weight ratios 47 and L2 control rates 48 of the TCP sessions #1 and #2 are set (controlled) by the TCP session controller 23.

On the basis of weights 46, the weight ratios 47, and the L2 control rates 48 set in the session attribute table 43, the TCP processor 25 controls the weights, the weight ratios, and the L2 control rates of the sessions #1 and #2.

(B) Operations

Next, the operation of the congestion control apparatus 1 according to an example of the first embodiment will now be described with reference to the accompanying drawings.

FIG. 5 is a diagram schematically illustrating an operation of the congestion control apparatus 1 according to an example of the first embodiment when congestion has occurred.

Upon receipt of a congestion notifying packet 61 from the switch 53 (see FIG. 3), the rate control processor 17 of the L2 processor 11 updates the congestion control table 33. In detail, the rate control processor 17 registers a controlled target IP address ("10.0.0.1") and an L2 control rate (100 Mb/s), which are described in the received congestion notifying packet 61, into a controlled target IP address 34 and an L2 control rate 35 of the congestion control table 33, respectively.

At the same time, the congestion controller 15 notifies the TCP session controller 23 of the L4 processor 21 of the occurrence of congestion, the controlled target IP address, an L2 control rate serving as rate controlling information (see step (1) in FIG. 5).

The TCP session controller 23 updates the L2 control rate 48 of a TCP session corresponding to the notified controlled target IP address in the session attribute table 43 using the notified rate controlling information (see step (2) in FIG. 5). Further, the TCP session controller 23 calculates the weight ratio of each TCP session and records the calculated ratios into the weight ratios 47 of the session attribute table 43.

Next, the TCP processor 25 calculates the window size of each TCP session on the basis of the values in the session attribute table 43 and performs window control.

Figure 6:
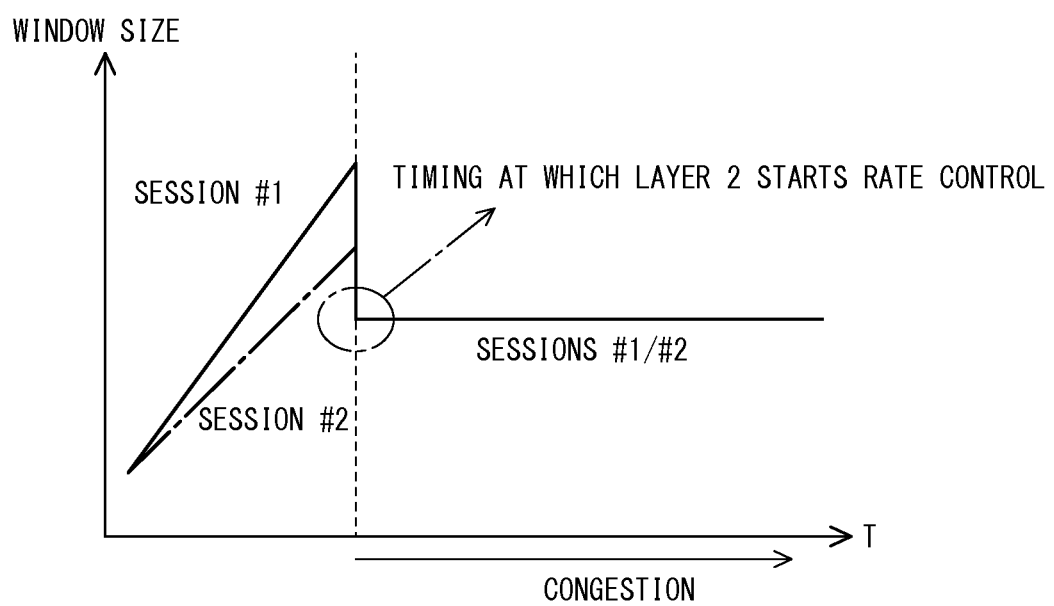
FIG. 6 is a graph schematically illustrating window control of Layer 4 performed by a congestion control apparatus of an example of the first embodiment upon an occurrence of a congestion.

The respective window sizes of the two TCP sessions #1 and #2 are controlled as denoted in FIG. 6.

FIG. 6 is a graph schematically illustrating window control on Layer 4 in the congestion control apparatus 1 of an example of the first embodiment upon an occurrence of a congestion. In the example FIG. 6 assumes that the TCP sessions #1 and #2 have the same weight 46 and the same RTT.

As illustrated in FIG. 6, this procedure also controls the output rate of the TCP to be the same rate controlled in Layer 2 simultaneously with the start of the rate control in Layer 2. This makes it possible to avoid generation of packet loss.

Next, description will now be made in relation to the operation of the congestion control apparatus 1 when congestion is dissolved with reference to FIG. 7.

Figure 7:
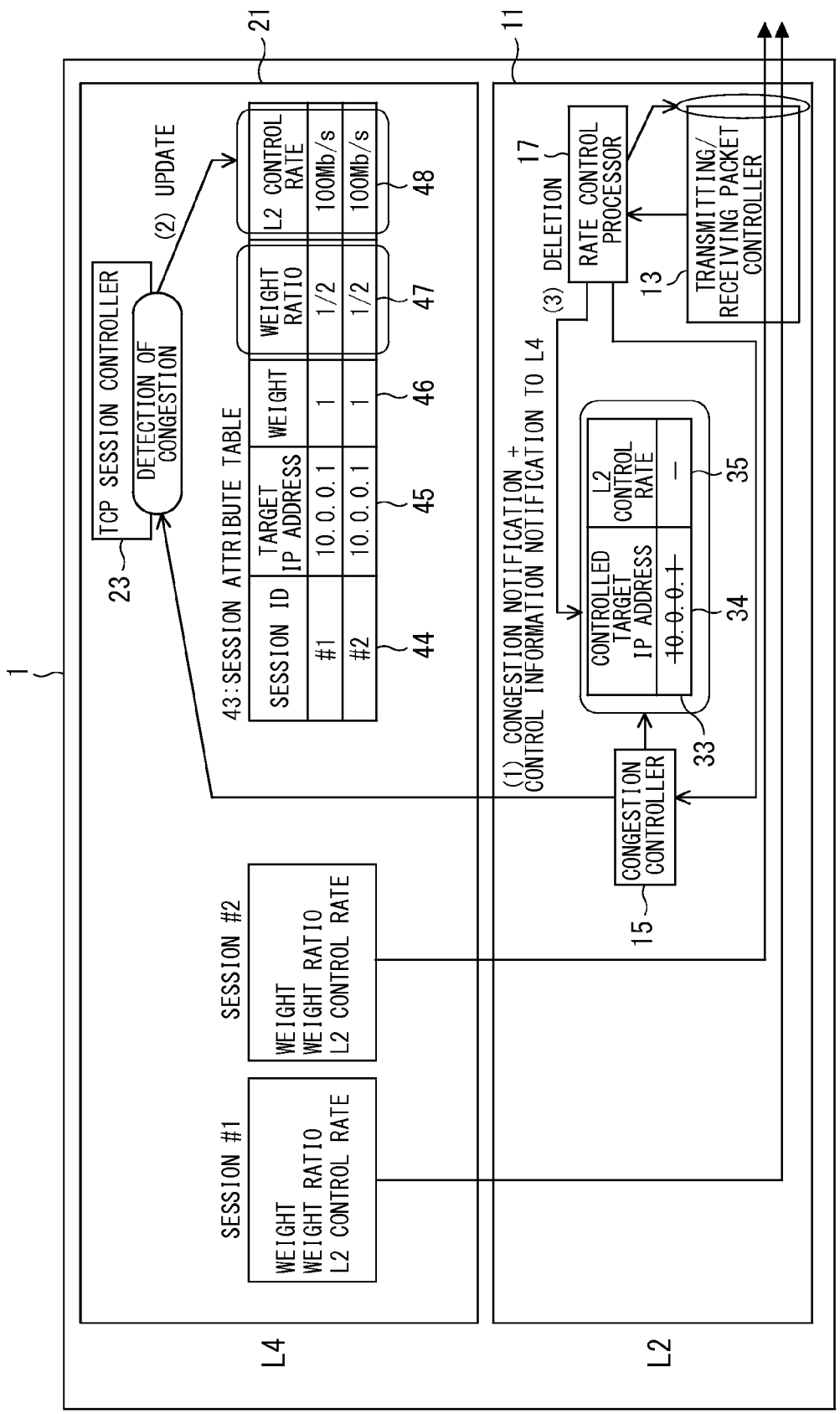
FIG. 7 is a diagram schematically illustrating operation performed by a congestion control apparatus of an example of the first embodiment when congestion is dissolved.

FIG. 7 is a diagram schematically illustrating operation of congestion control apparatus 1 of an example of the first embodiment when congestion is dissolved.

For example, under the state of FIG. 5 described above, when the rate control processor 17 of the L2 processor 11 receives no congestion notifying packet 61 from the switch 53 for a predetermined time period, the congestion controller 15 of the L2 processor 11 determines that the congestion in Layer 2 has been dissolved. An example of the predetermined time period is congestion cancelling time defined in IEEE802.1Qau. Then, the rate control processor 17 cancels the rate control on Layer 2.

Besides, the rate control processor 17 deletes the entry of the target IP address the congestion in which has been determined to be dissolved from the congestion control table 33 (see step (3) in FIG. 7).

The congestion controller 15 notifies the TCP session controller 23 included in the L4 processor 21 of the congestion dissolution and the target IP address of the control-canceling target (see step (1) of FIG. 7).

The TCP session controller 23 of the L4 processor 21 updates the value of the L2 control rate 48 of the TCP session corresponding to the target IP address of the control-canceling target in the session attribute table 43 (see step (2) in FIG. 7). In the example of FIG. 7, the TCP session controller 23 sets "0 Mb/s" in the L2 control rate 48 to cancel the control on Layer 4 of the first embodiment. The value "0 Mb/s" set in the L2 control rate 48 represents that the control of the first embodiment is not performed on Layer 4. In other words, setting the L2 control rate 48 in the session attribute table 43 to be "0 Mb/s" cancels the rate control of the first embodiment on Layer 4 and in turn uses Window control of the TCP standard.

Next, description will now be made in relation to operation of the congestion control apparatus 1 when a new TCP session is added with reference to FIG. 8.

Figure 8:
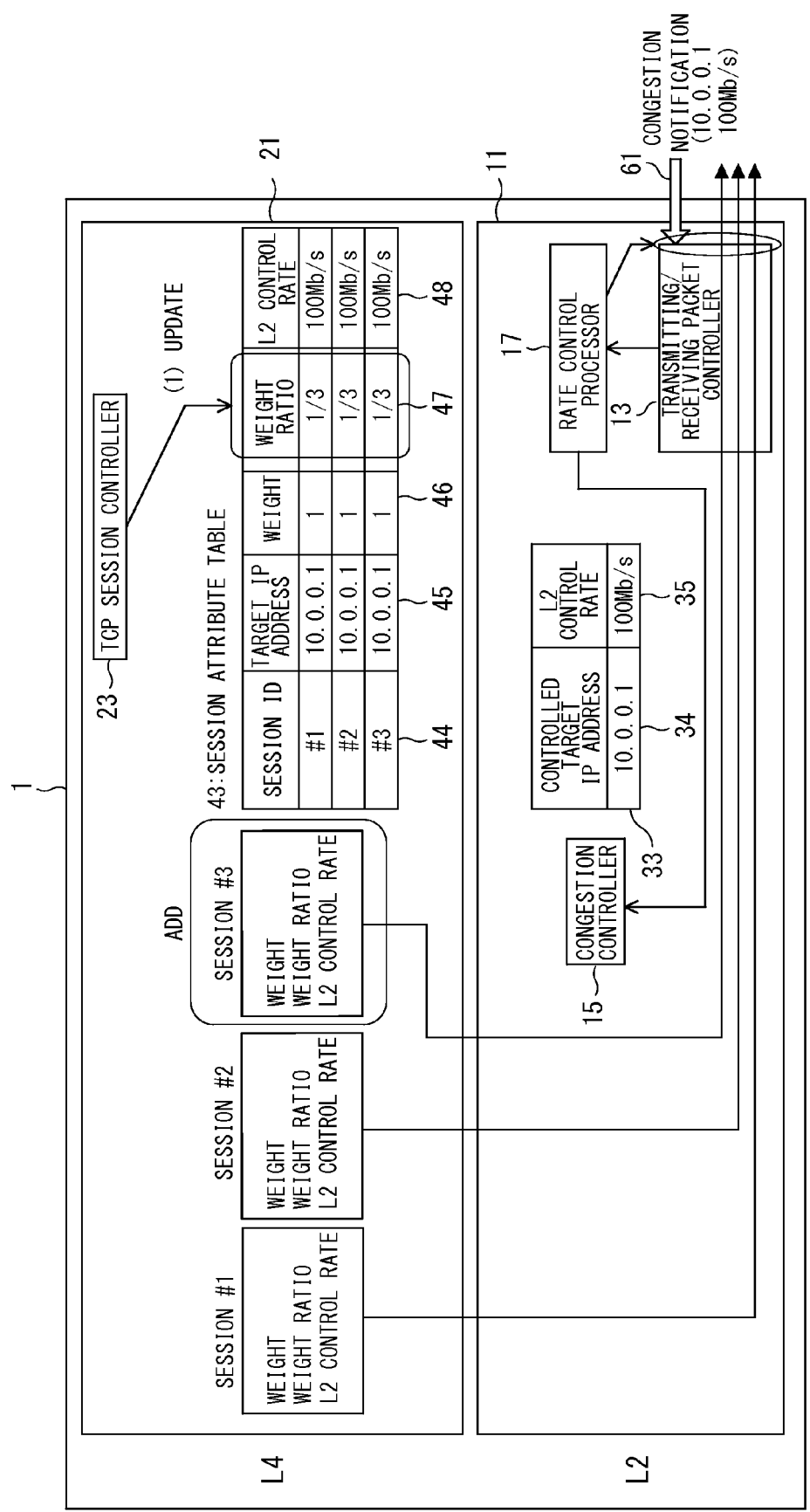
FIG. 8 is a diagram schematically illustrating operation performed by a congestion control apparatus of an example of the first embodiment when a TCP section is added.

FIG. 8 is a diagram schematically illustrating operation of the congestion control apparatus 1 when a RCP session is to be added.

For example, under the state of FIG. 7 described above, a TCP session #3 is added as illustrated in FIG. 8. The target IP address of the TCP session #3 is the same as the controlled target IP address. For the above, the TCP session controller 23 of the L4 processor 21 adds an entry of the TCP session #3 into the session attribute table 43. At that time, the TCP session controller 23 sets a new L2 control rate 48 for the session #3 and sets the weight 46 for the new session #3 to be the same value as those of the existing TCP sessions #1 and #2. Then the TCP session controller 23 responsively changes the weight ratios 47 of the TCP sessions #1 and #2 from "½" to "⅓" and also sets the value "⅓" in the weight ratio 47 of the TCP session #3 (see step (1) in FIG. 7).

Next, description will now be made in relation to operation of the congestion control apparatus 1 when a TCP session is to be deleted with reference to FIG. 9.

Figure 9:
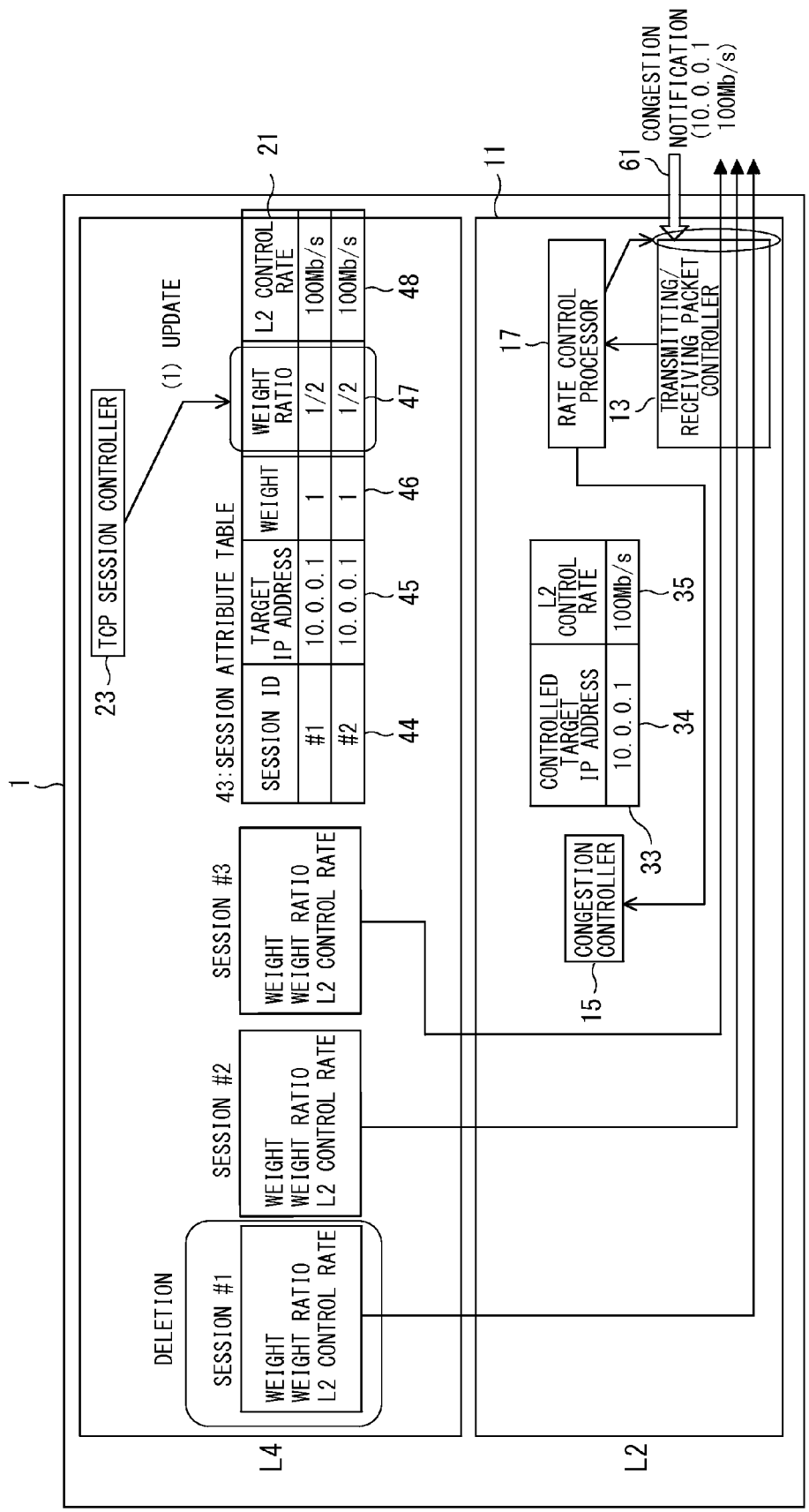
FIG. 9 is a diagram schematically illustrating operation performed by a congestion control apparatus of an example of the first embodiment when a TCP section is deleted.

FIG. 9 is a diagram schematically illustrating operation of the congestion control apparatus 1 of an example of the first embodiment when a TCP session is to be deleted.

For example, under the state of FIG. 8 described above, the TCP session #1 is deleted as illustrated in FIG. 9. The target IP address of the TCP session #1 is the same as the controlled target IP address. For the above, the TCP session controller 23 deletes the entry of the TCP session #1 from the session attribute table 43. At that time, in response to the deletion of the TCP session #1, the TCP session controller 23 changes the weight ratios 47 of the TCP sessions #2 and #3 from "⅓" to "½" (see step (1) in FIG. 9).

The procedures of above FIGS. 6-9 are collectively denoted in FIG. 10.

FIGS. 10A-10C are flow charts illustrating successions of procedurals steps performed by the congestion control apparatus 1. Specifically, FIG. 10A represents processing upon an occurrence of a congestion; FIG. 10B represents processing when congestion is dissolved; and FIG. 10C represents processing when a TCP session is to be added or deleted.

First of all, description will now be made in relation to processing performed upon an occurrence of a congestion with reference to the flow chart of FIG. 10A.

When congestion occurs in L2 layer, the rate control processor 17 of the L2 processor 11 receives a congestion notifying packet 61 from the switch 53 at step S1.

Then, in step S3, it is determined that a congestion arises in Layer 2, and the congestion controller 15 notifies the TCP session controller 23 of the L4 processor 21 of the occurrence of the congestion. The congestion controller 15 also notifies the TCP session controller 23 of a controlled target IP address 63 and the L2 control rate 65, serving as rate controlling information, that are described in the congestion notifying packet 61.

Besides, the rate control processor 17 updates the congestion control table 33 in step S7.

In the next step S5, the TCP session controller 23 of the L4 processor 21 detects the congestion. In step S9, the TCP session controller 23 updates the values in the L2 control rates 48 in the session attribute table 43 associated with all the TCP sessions that coincide with the controlled target IP address.

In ensuing step S11, the TCP processor 25 changes the window size of each TCP session that coincides with the controlled target IP address on the basis of the session attribute table 43 and thereby performs the TCP output rate control.

Description will now be made in relation to processing performed when congestion is dissolved with reference to the flow chart of FIG. 10B.

When the congestion has been dissolved, the switch 53 aborts the transmission of the congestion notifying packet 61, so that the rate control processor 17 of the L2 processor 11 does not receive a congestion notifying packet 61 from the switch 53 for a predetermined time period in step S13.

In this case, in step S15, it is determined that the congestion in Layer 2 has been dissolved, and the congestion controller 15 of the L2 processor 11 notifies the TCP session controller 23 of the L4 processor 21 of dissolution of the congestion. At that time, the congestion controller 15 also notifies the TCP session controller 23 of the cancellation-target IP address.

In step S7, the rate control processor 17 updates the congestion control table 33.

In step S17, the TCP session controller 23 of the L4 processor 21 detects dissolution of the congestion. In step S19, the TCP session controller 23 updates the values in the L2 control rates 48 in the session attribute table 43 associated with all the TCP sessions that coincide with the cancellation-target IP address.

In ensuing step S21, the TCP processor 25 changes the window size of each TCP session that coincides with the cancellation-target IP address and thereby cancels the TCP output rate control.

Next, description will now be made in relation to processing performed when a TCP process is added or deleted with reference to the flow chart of FIG. 10C.

In adding or deleting of a TCP session in step S23, only if a session that is added or deleted coincides with the controlled target IP address, the TCP session controller 23 updates the values in the weight ratios 47 and the L2 control rates 48 in the session attribute table 43 associated with all the TCP sessions that coincide with the controlled target IP address in step S25.

In next step S27, the TCP processor 25 changes the window size of each TCP session that coincides with the controlled target IP address.

The operation of the congestion control apparatus 1 will now be described along with an example.

Here, the congestion control apparatus 1 is assumed to be involved in the network configuration described above with reference to FIG. 3

In the network configuration of FIG. 3, three different tenants A, B, and C communicate with the VM 57-1, 57-2, and 57-3 of tenants included in the server 51, respectively, and receives service and environment. As described the above, this exemplary network configuration applies IEEE802.1Qau to a manner of controlling congestion. The link rate between the switch 53 and each node is commonly 100 Mb/s.

Figure 11:
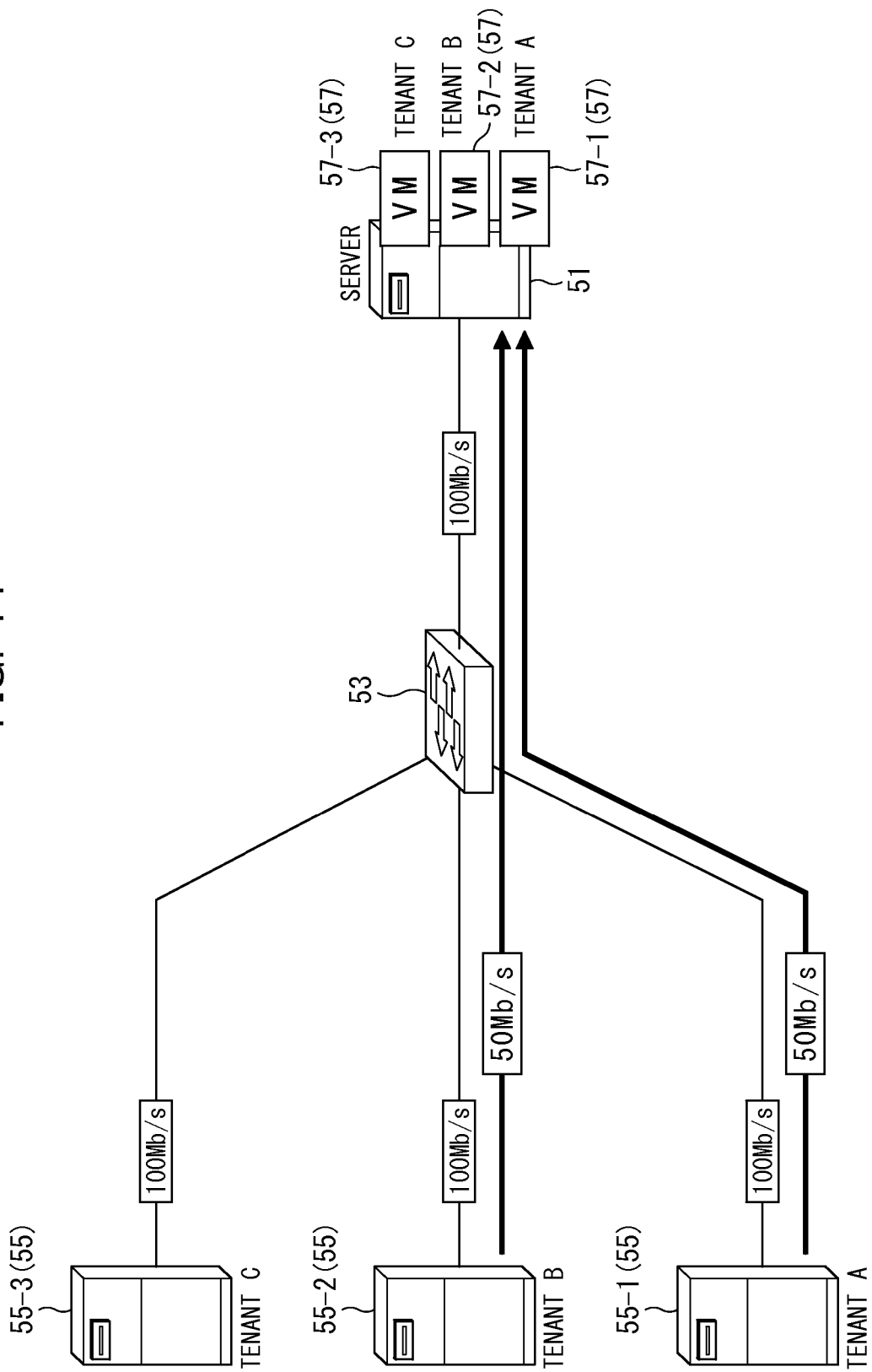
FIG. 11 is a diagram schematically illustrating when no congestion arises in the exemplary network configuration in FIG. 3.

First of all, as denoted in FIG. 11, the tenants A and B start communication with the server 51 at the same output rate of 50 MB/s to the server 51.

The tenants A and B each includes the above congestion control apparatus 1. For simplification, the description hereinafter focuses only on the congestion control apparatus 1 included in the tenant A.

As illustrated in FIG. 12C, two TCP sessions #1 and #2 are present in the tenant A under the state of FIG. 11. After the start of the communication, the TCP processor 25 of the L4 processor 21 increases the respective window sizes of the TCP sessions #1 and #2 as illustrated in FIG. 12A, so that the output rates of these sessions are increased as illustrated in FIG. 12B.

In this case, assuming that the output rate from the tenant A is 50 Mb/s, the output rates of the TCP sessions #1 and #2, which have the same RTT of 10 ms, are calculated as follows.

output rate of TCP session #1=8×40 KB (window size)×0.01 s=32 Mb/s output rate of TCP session #2=8×22.5 KB (window size)×0.01 s=18 Mb/s The multiplier "8" converts the unit of byte into the unit of bit.

The weights 46 of these TCP sessions in the session attribute table 43 are not changed from the default setting of "1". For the above, the TCP session controller 23 sets the same value "½" into the weight ratios 47 of the TCP sessions #1 and #2.

Figure 13:
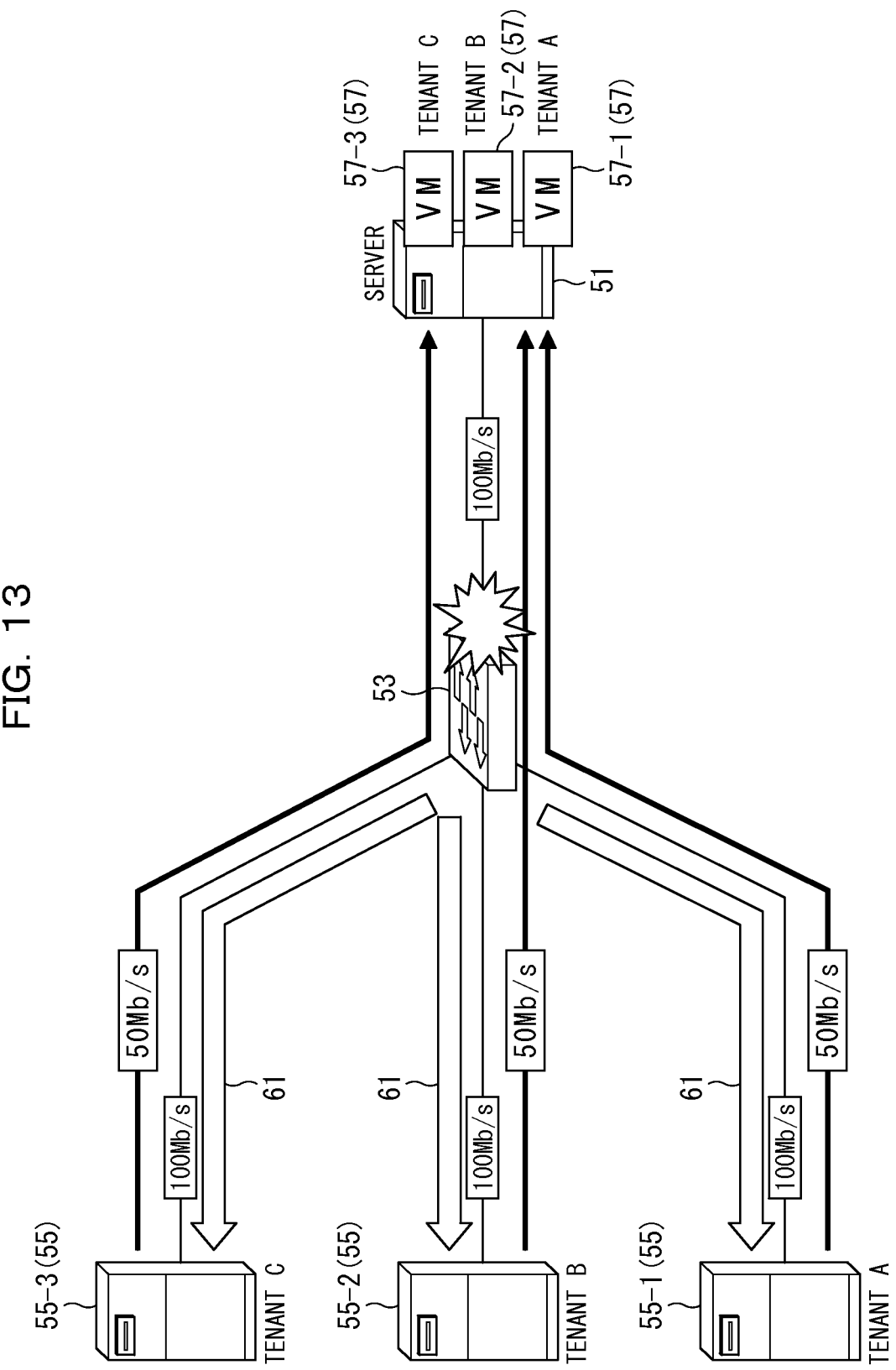
FIG. 13 is a diagram schematically illustrating the exemplary network configuration in FIG. 3 upon an occurrence of a congestion.

After that, as illustrated in FIG. 13, when the tenant C starts communication with the server 51 at the output rate of 50 Mb/s, the total output rates from the tenants A-C exceeds 100 Mb/s, which is the link rate between the server 51 and the switch 53. Consequently, congestion occurs on switch 53, and the switch 53 transmits congestion notifying packets 61 to each transmission-source node (i.e., the tenants A-C).

For example, the switch 53 notifies the nodes of an L2 control rate of 33 Mb/s with the congestion notifying packets 61 as illustrated in FIG. 14, so that the nodes can use 33 Mb/s calculated by evenly dividing 100 Mb/s bandwidth for transmission.

Figure 15A:
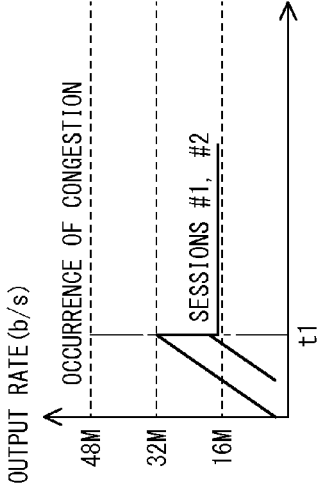
FIGS. 15A-15C are diagrams schematically illustrating a congestion control in FIG. 14, wherein FIG. 15A indicates a window size.
Figure 15B:
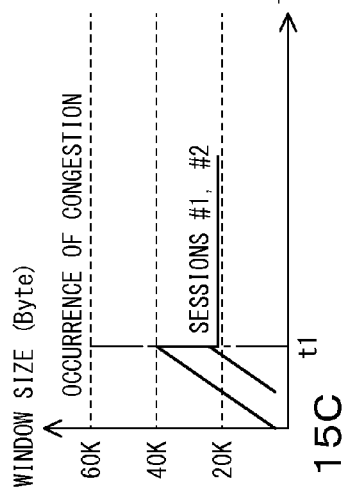
Figure 15C:
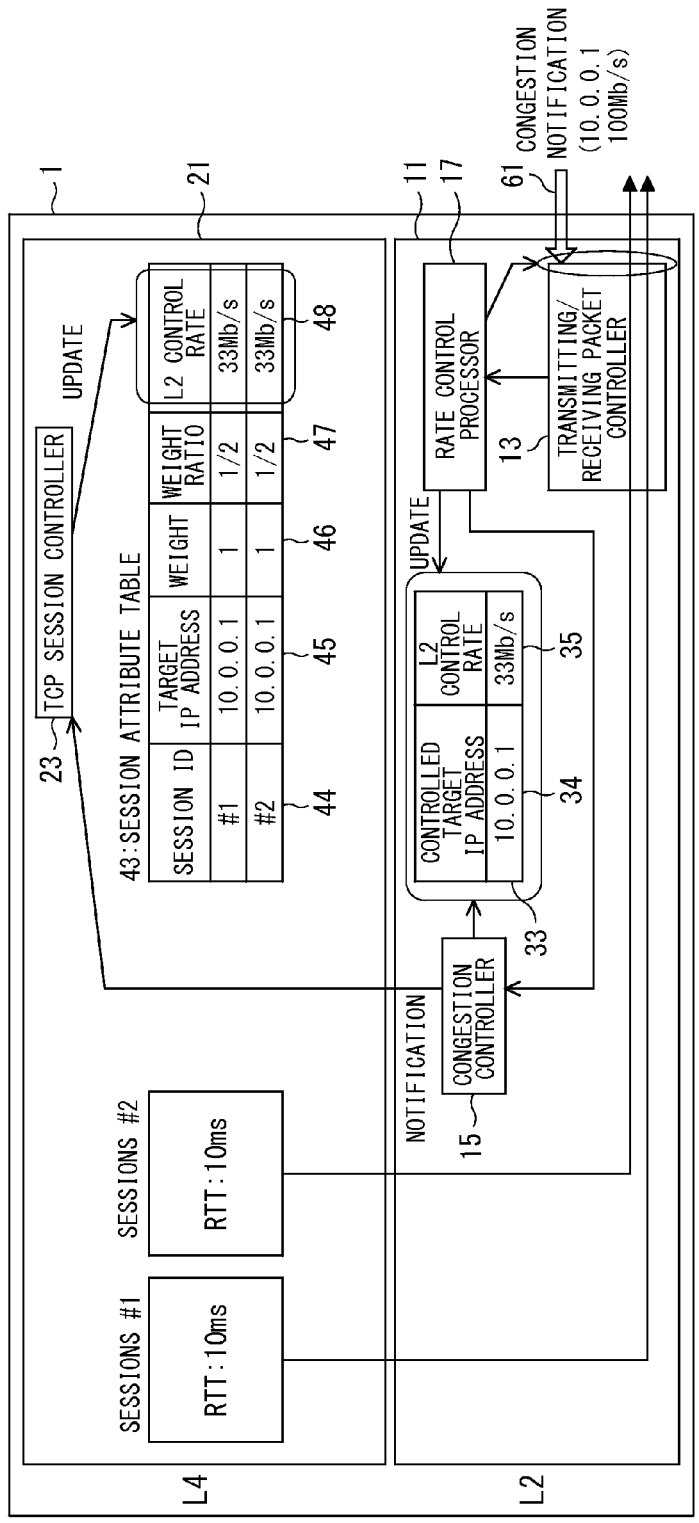

FIGS. 15A-15C illustrate a congestion control in the tenant A after the notification of congestion as described with reference to FIG. 14. As illustrated in FIGS. 15A and 15B, congestion occurs at time point t1 and the output rates of the L2 control rates are restricted to 33 Mb/s. As illustrated in FIG. 15 C, the congestion controller 15 of the L2 processor 11 notifies the TCP session controller 23 of the L4 processor 21 of congestion notification, the controlled target IP address "10.0.0.1", and "33 Mb/s" serving as the rate controlling information.

Upon receipt of the congestion notification from the congestion controller 15 of the L2 processor 11, the TCP session controller 23 retrieves a TCP session having target IP address 45 the same as "10.0.0.1", and updates the value of the L2 control rate 48 of the retrieved corresponding TCP session to "33 Mb/s".

Figures 16A, 16B, 16C:
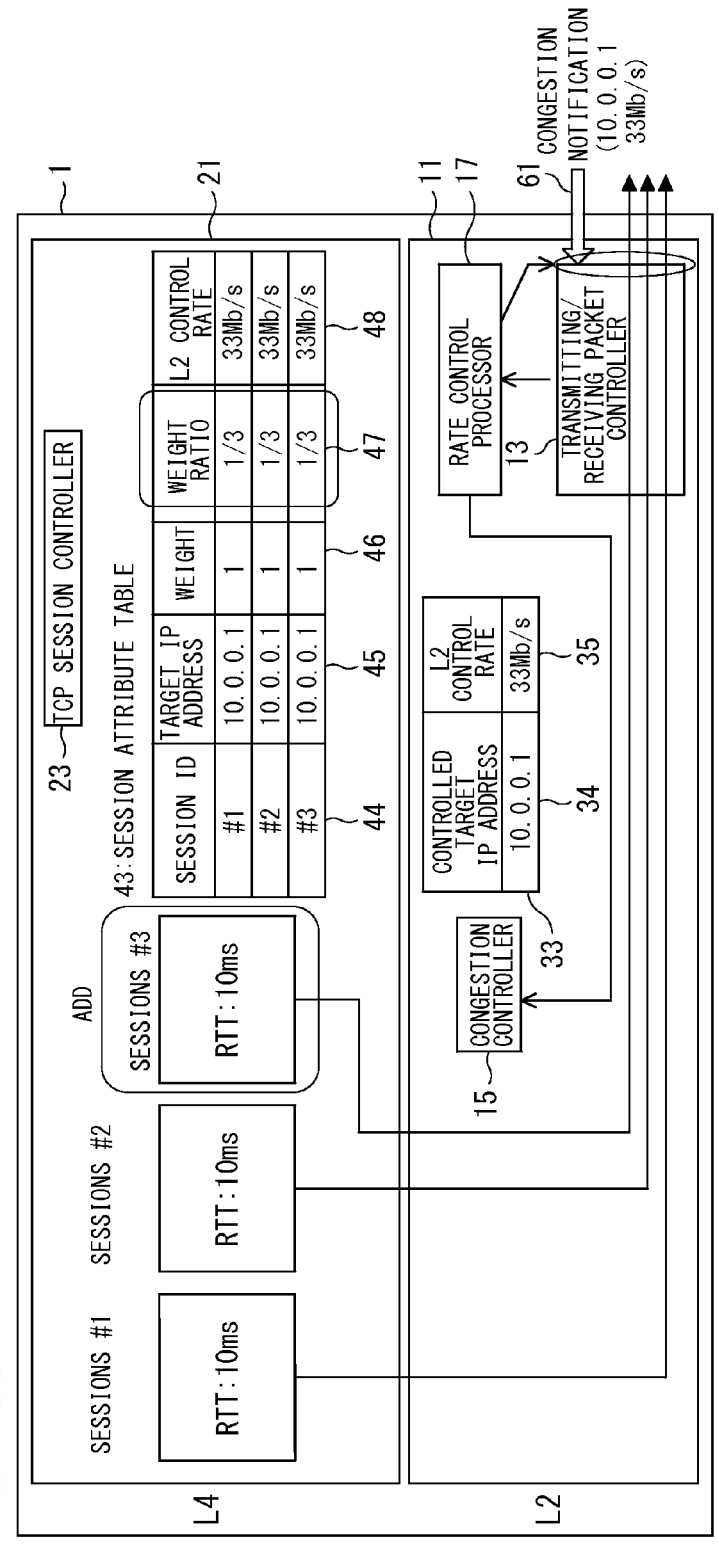
FIGS. 16A-16C are diagrams schematically illustrating a congestion control when a TCP session is added in the exemplary network configuration in FIG. 3, wherein FIG. 16A indicates a window size.

Then, the TCP processor 25 changes the window sizes of the TCP sessions #1 and #2 as follows.

output rate of TCP session #1=33 Mb/s (L2 control rate)×½ (weight ratio)=16.5 Mb/s window size of TCP session #1=16.5 Mb/s×0.01 s (RTT)/8=20.6 KB output rate of TCP session #2=33 Mb/s (L2 control rate)×½ (weight ratio)=16.5 Mb/s window size of TCP session #2=16.5 Mb/s×0.01 s (RTT)/8=20.6 KB Next, FIGS. 16A-16C illustrate processing when a TCP session #3 is to be added in the tenant A.

As illustrated in FIGS. 16A and 16B, a TCP session #3 is added at time point t2. The added TCP session #3, which has a target IP address "10.0.0.1", is a TCP session that is to be controlled.

For the above, as illustrated in FIG. 16C, the TCP session controller 23 changes the values of the weight ratios 47 of the TCP sessions #1 and #2 having a target IP address "10.0.0.1" to "⅓". In accordance with this change, the TCP processor 25 recalculates the window sizes and changes the window sizes of the TCP sessions #1-#3 as follows.

output rate of TCP session #1=33 Mb/s (L2 control rate)×⅓ (weight ratio)=11 Mb/s window size of TCP session #1=11 Mb/s×0.01 s (RTT)/8=13.8 KB output rate of TCP session #2=33 Mb/s (L2 control rate)×⅓ (weight ratio)=11 Mb/s window size of TCP session #2=11 Mb/s×0.01 s (RTT)/8=13.8 KB output rate of TCP session #3=33 Mb/s (L2 control rate)×⅓ (weight ratio)=11 Mb/s window size of TCP session #3=11 Mb/s×0.01 s (RTT)/8=13.8 KB Next, FIGS. 17A-17C illustrate processing when a TCP session #1 is deleted in the tenant A.

As illustrated in FIGS. 17A and 17B, the TCP session #1 is deleted at time point t3. The deleted session #1, which has a target IP address "10.0.0.1", is a TCP session that is to be controlled.

Figure 18:
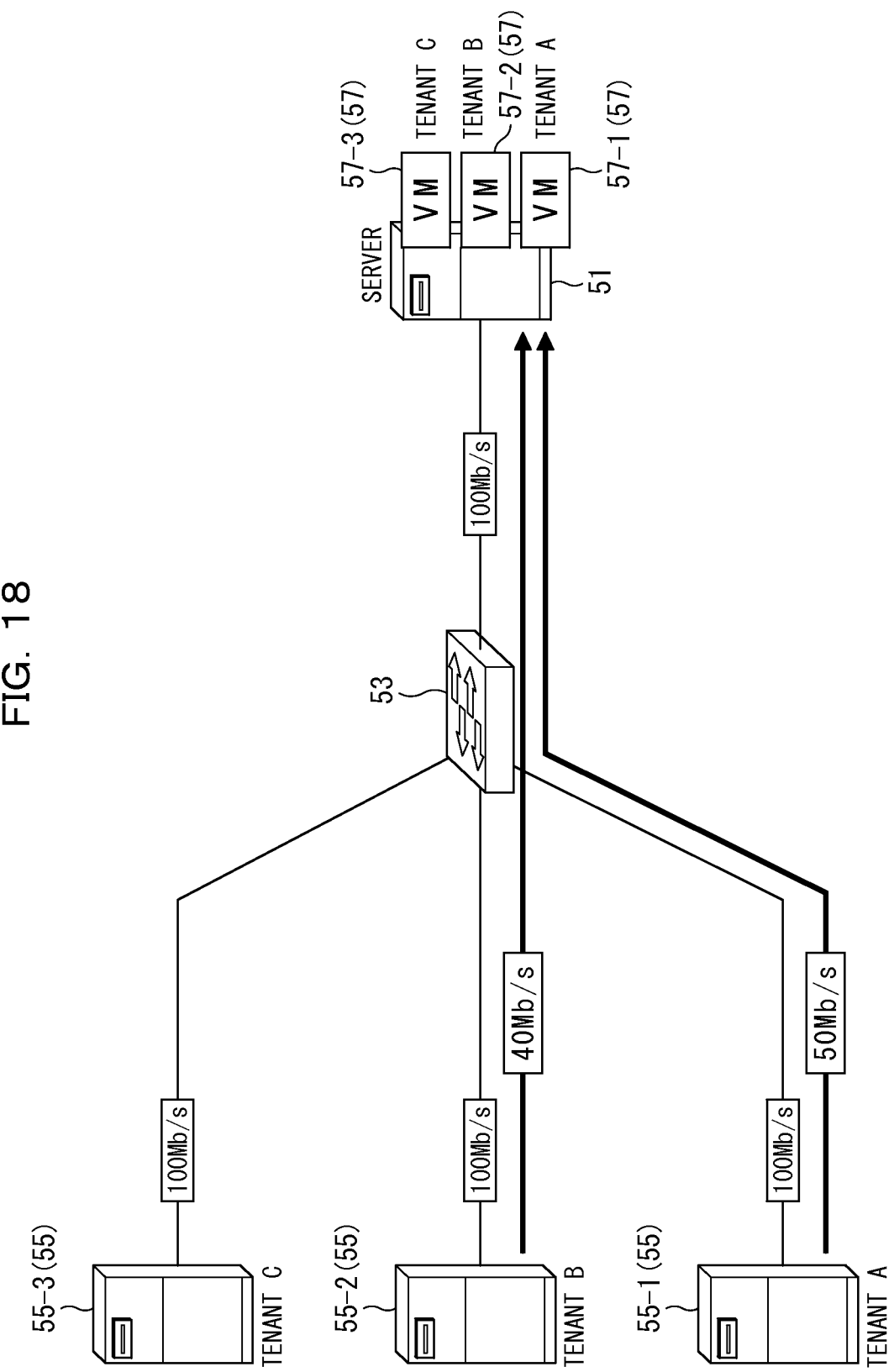
FIG. 18 is a diagram schematically illustrating the exemplary network configuration when congestion is dissolved.
Figure 20:
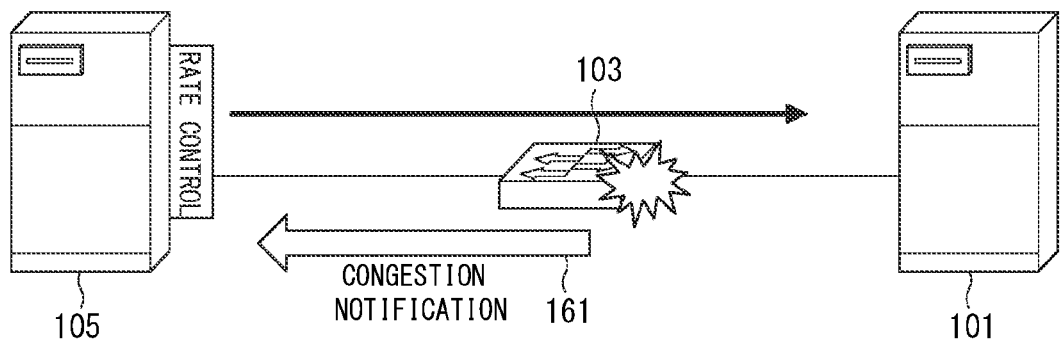
FIG. 20 is a diagram schematically illustrating congestion control that IEEE802.1Qau defines.
Figure 21:
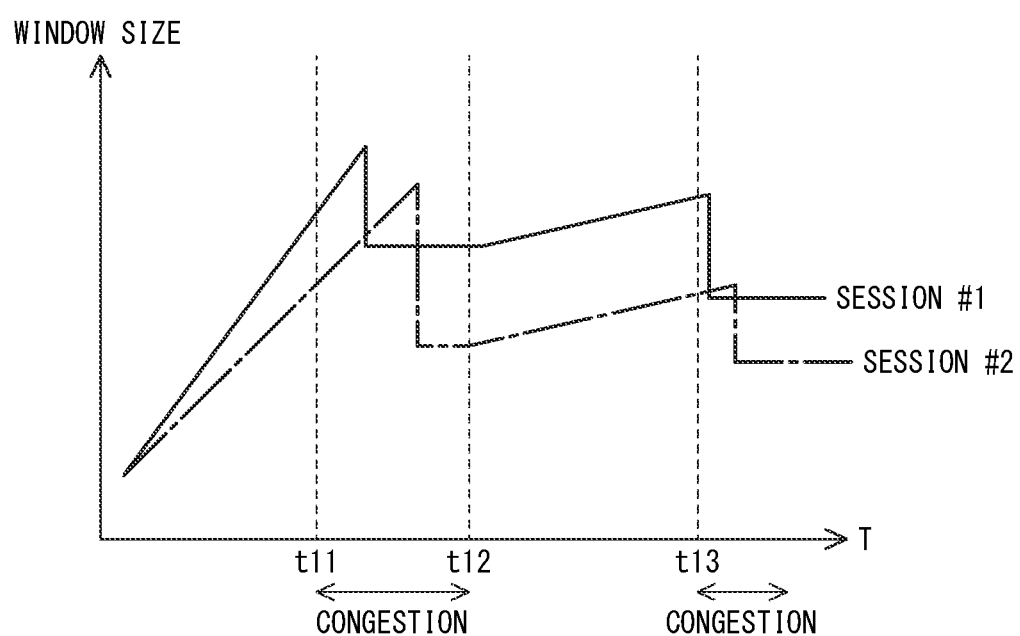
FIG. 21 is a diagram schematically illustrating control on a window size in TCP.
Figure 22A:
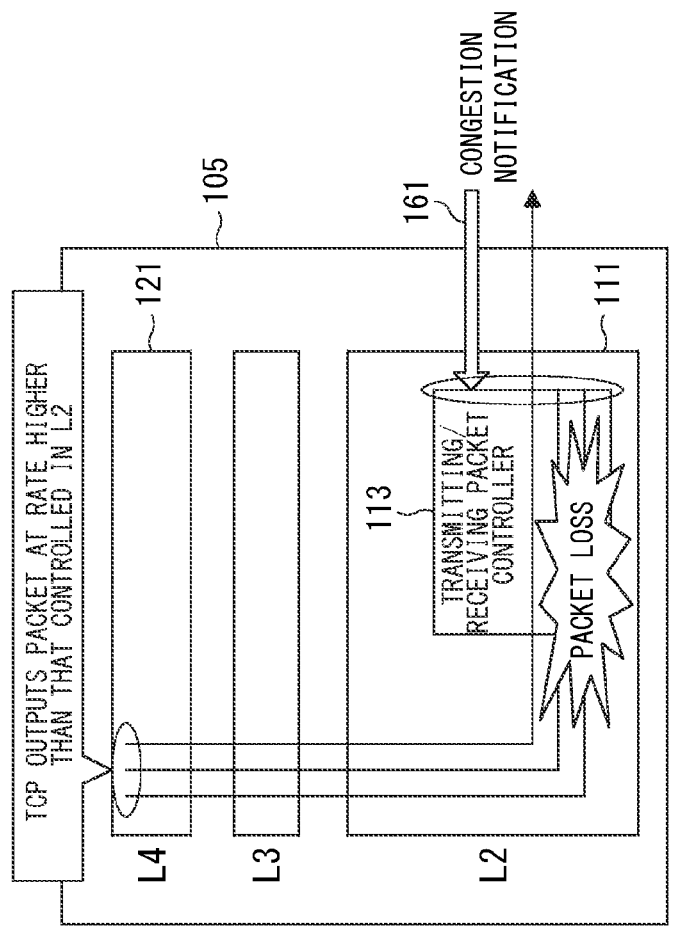
FIGS. 22A and 22B are diagrams schematically illustrating congestion controls performed in Layer 2 and Layer 4, wherein FIG. 22A indicates output rates.
Figure 22B:
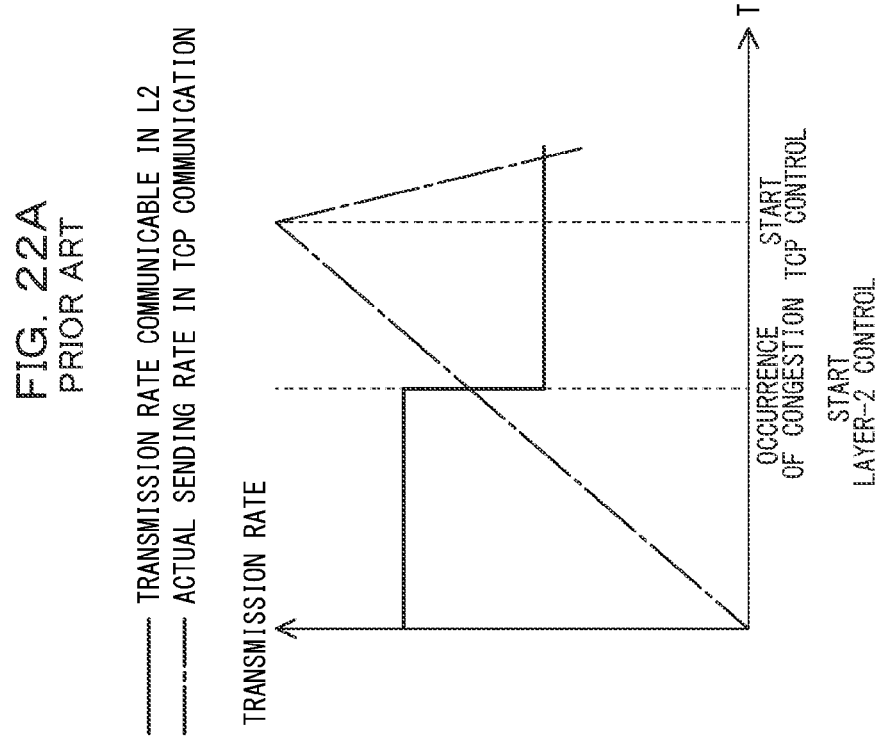

For the above, as illustrated in FIG. 17C, the TCP session controller 23 changes the values of the weight ratios 47 of the TCP sessions #2 and #3 having a target IP address "10.0.0.1" to "½". In accordance with this change, the TCP processor 25 recalculates the window sizes and changes the window sizes of the TCP sessions #2 and #3 as follows.

output rate of TCP session #2=33 Mb/s (L2 control rate)×½ (weight ratio)=16.5 Mb/s window size of TCP session #2=16.5 Mb/s×0.01 s (RTT)/8=20.6 KB output rate of TCP session #3=33 Mb/s (L2 control rate)×½ (weight ratio)=16.5 Mb/s window size of TCP session #3=16.5 Mb/s×0.01 s (RTT)/8=20.6 KB Next, FIG. 18 illustrates a state where the communication of the tenant C is finished and the congestion is therefore dissolved.

When the congestion of the switch 53 has been dissolved, the switch 53 aborts the transmission of the congestion notifying packets 61 to the transmission source nodes (tenants A and B).

In this case, each of the congestion control apparatuses 1 in the transmission nodes (tenants A and B) cancels rate control, and increases the transmission rates again.

FIGS. 19A and 19B illustrate the congestion control that performed by the tenant A after the dissolution of the congestion illustrated in FIG. 18. As illustrated in FIGS. 19A and 19B, after the rate control on Layer 2 is cancelled at time point t4 in response to the dissolution of the congestion, the congestion controller 15 notifies the TCP session controller 23 of the L4 processor 21 of the congestion dissolution notification and cancellation-target IP address "10.0.0.1".

Upon receipt of the congestion dissolution notification from the congestion controller 15 of the L2 processor 11, the TCP session controller 23 retrieves a TCP session having a target IP address 45 the same as "10.0.0.1" and changes the value of the L2 control rate 48 of the corresponding retrieved TCP session to "0 Mb/s".

Then, the TCP processor 25 increases the window sizes and the output rates of the TCP sessions #2 and #3 as illustrated in FIGS. 19A and 19B.

As detailed above, according to an embodiment of the present invention, in the event of a congestion occurrence, Layer 2 notifies Layer 4 of the occurrence of the congestion, a Layer 2 control rate, and a target IP address. This can prevent any packet loss in Layer 2 which is caused by a time delay between when a congestion control is initiated in Layer 2 and when a congestion control is initiated in Layer 4.

Reducing window sizes of only TCP sessions involved in the congestion, the example of the first embodiment can prevent any packet loss in Layer 2, not influencing TCP sessions not involved in the congestion.

This makes it possible to control output rates of only the TCP sessions that influences the congestion, and consequently, the rate of TCP sessions not influencing the congestion are not lowered.

(C) Miscellaneous

The foregoing embodiment can be variously changed or modified without departing from the gist of the embodiment.

For example, the above first embodiment sets the value "0 Mb/s" in the L2 control rate 48 of the session attribute table 43 to cancel the rete control on Layer 4 and in turn to use congestion control defined in the TCP standard. However, the control manner should by no means limited to this. Alternatively, the cancellation of the rate control may be instructed by setting another value in the L2 control rate 48.

In the above first embodiment, the CPU 3 of the information processing apparatus 55 executes a congestion control program and thereby functions as the L2 processor 11, the transmitting/receiving packet controller 13, the congestion controller 15, the rate control processor 17, the L4 processor 21, a TCP session controller 23, and the TCP processor 25 illustrated in FIG. 2.

The memory 5 of the information processing apparatus 55 functions as the congestion control table storing unit 31 and the session attribute table storing unit 41.

The program (controlling program) that achieves the functions of the L2 processor 11, the transmitting/receiving packet controller 13, the congestion controller 15, the rate control processor 17, the L4 processor 21, a TCP session controller 23, and the TCP processor 25 are provided in the form of being recorded in a tangible and non-transient computer-readable storage medium, such as a flexible disk, a CD (e.g., CD-ROM, CD-R, and CD-RW), a DVD (DVD-ROM, DVD-RAM, DVD-R, DVD+R, DVD-RW, DVD+RW, and HD DVD), Blu-ray disk, a magnetic disk, an optical disk, and an magneto-optical disk. A computer reads the program from the recording medium and stores the read program in an internal or external storage device for future use. Alternatively, the program may be recorded in a recording device (recording medium), such as a magnetic disk, an optical disk, or a magneto-optical disk, and may be provided from the recording device to the computer via a communication path.

Further alternatively, in achieving the functions of the L2 processor 11, the transmitting/receiving packet controller 13, the congestion controller 15, the rate control processor 17, the L4 processor 21, a TCP session controller 23, and the TCP processor 25, the program stored in an internal storage device (corresponding to the memory 5 and the storage 8 of the information processing apparatus 55 in the illustrated first embodiment) is executed by the microprocessor (corresponding to the CPU3 of the information processing apparatus 55 in the first embodiment) of the computer. At that time, the computer may read the program stored in the recording medium and may execute the program.

In the first embodiment, a computer is a concept of a combination of hardware and an Operating System (OS), and means hardware which operates under control of the OS. Otherwise, if a program does not need an OS, but does operate hardware independently of an OS, the hardware itself corresponds to the computer. Hardware includes at least a microprocessor such as a CPU and means to read a computer program recorded in a recording medium. In the first embodiment, the information processing apparatus 55 has a function of a computer.

Upon the occurrence of the congestion, the first embodiment can prevent any packet loss caused by a time lag between when a congestion control is initiated in the lower layer and when a congestion control is initiated in the upper layer.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A method of controlling a congestion in a communication scheme using a lower layer that performs a first congestion control and an upper layer that performs a second congestion control different from the first congestion control, the method comprising:
   detecting a congestion in the lower layer;
   notifying, from the lower layer to upper layer, the occurrence of the congestion and congestion control information related to the congestion;
   setting, in the upper layer, an output rate for each of at least one congestion-related upper-layer session that is processed in the upper layer and is related to the congestion; and
   retaining a control rate in the lower layer, the control rate being included in the congestion control information, and a weight for each of the at least one congestion-related upper-layer session, in the upper layer, the weight indicating a priority of the congestion-related upper-layer session,
   wherein the weight is dynamically set to each of the at least one congestion-related upper-layer session, based on a ratio of an output size for the congestion-related upper-layer session at time of the occurrence of the congestion.

2. The method according to claim 1, wherein a same weight is set to the at least one congestion-related upper-layer session.

3. The method according to claim 1, wherein the weight that is static is set to each of the at least one congestion-related upper-layer session, based on presetting.

4. The method according to claim 1, wherein the congestion control information further comprises target address information of an address of a target in the lower layer, an output rate of the target being to be controlled, and
   the method further comprises specifying, upon the occurrence of the congestion, at least one upper-layer session corresponding to the target address information, as the at least one congestion-related upper-layer session.

5. The method according to claim 4, further comprising:
   detecting dissolution of the congestion in the lower layer;
   notifying, from the lower layer to upper layer, the dissolution of the congestion and target address information related to the dissolved congestion; and
   setting, for each of at least one upper-layer session corresponding to the target address information related to the dissolved congestion, the output rate again.

6. The method according to claim 1, further comprising:
   upon the occurrence of the congestion, calculating the output rate for each of the at least one congestion-related upper-layer session, using the lower layer control rate and a ratio of a corresponding weight of the congestion-related upper-layer session to a sum of the weight of the at least one congestion-related upper-layer session, in the upper layer; and
   calculating an output size for each of the at least one congestion-related upper-layer session, using the calculated output rate and a round trip time, of the at least one congestion-related upper-layer session.

7. The method according to claim 1, further comprising
   performing, when the control rate retained in the at least one congestion-related upper-layer session indicates dissolution of congestion, the second congestion control of the upper layer.

8. An apparatus for controlling congestion in a communication scheme using a lower layer that performs a first congestion control and an upper layer that performs a second congestion control different from the first congestion control, the apparatus comprising:
   a detector that detects a congestion in the lower layer;
   a notifier that notifies, from the lower layer to upper layer, the occurrence of the congestion and congestion control information related to the congestion;
   a processor that sets, in the upper layer, an output rate for each of at least one congestion-related upper-layer session that is processed in the upper layer and is related to the congestion, and
   a management table that retains a control rate in the lower layer, the control rate being included in the congestion control information, and a weight for each of the at least one congestion-related upper-layer session, in the upper layer, the weight indicating a priority of the congestion-related upper-layer session,
   wherein the weight is dynamically set to each of the at least one congestion-related upper-layer session, based on a ratio of an output size for the congestion-related upper-layer session at time of the occurrence of the congestion, in the management table.

9. The apparatus according to claim 8, wherein a same weight is set to the at least one congestion-related upper-layer session, in the management table.

10. The apparatus according to claim 8, wherein the weight that is static is set to each of the at least one congestion-related upper-layer session, based on presetting, in the management table.

11. The apparatus according to claim 8, wherein the congestion control information further comprises target address information of an address of a target in the lower layer, an output rate of the target being to be controlled, and
    the processor specifies, upon the occurrence of the congestion, at least one upper-layer session corresponding to the target address information, as the at least one congestion-related upper-layer session.

12. The apparatus according to claim 11, wherein
    the detector detects dissolution of the congestion in the lower layer,
    the notifier notifies, from the lower layer to upper layer, the dissolution of the congestion and target address information related to the dissolved congestion, and the processor sets, for each of at least one upper-layer session corresponding to the target address information related to the dissolved congestion, the output rate again.

13. The apparatus according to claim 8, wherein
upon the occurrence of the congestion, the processor calculates the output rate for each of the at least one congestion-related upper-layer session, using the lower layer control rate and a ratio of a corresponding weight of the congestion-related upper-layer session to a sum of the weight of the at least one congestion-related upper-layer session, in the upper layer, and
the processor calculates an output size for each of the at least one congestion-related upper-layer session, using the calculated output rate and a round trip time, of the at least one congestion-related upper-layer session.

14. The apparatus according to claim 8, wherein the processor performs, when the control rate retained in the at least one congestion-related upper-layer session indicates dissolution of congestion, the second congestion control of the upper layer.

15. A system comprising an information processing apparatus and a host apparatus that are connected to each other via a delay apparatus, the system communicating in a communication scheme using a lower layer that performs a first congestion control and an upper layer that performs a second congestion control different from the first congestion control, the information processing apparatus comprising:
a detector that detects a congestion in the lower layer;
a notifier that notifies, from the lower layer to upper layer, the occurrence of the congestion and congestion control information related to the congestion;
a processor that sets, in the upper layer, an output rate for each of at least one congestion-related upper-layer session that is processed in the upper layer and is related to the congestion; and
a management table that retains a control rate in the lower layer, the control rate being included in the congestion control information, and a weight for each of the at least one congestion-related upper-layer session, in the upper layer, the weight indicating a priority of the congestion-related upper-layer session,
wherein the weight is dynamically set to each of the at least one congestion-related upper-layer session, based on a ratio of an output size for the congestion-related upper-layer session at time of the occurrence of the congestion, in the management table.

16. A non-transitory computer-readable recording medium having stored therein, a congestion control program in a communication scheme using a lower layer that performs a first congestion control and an upper layer that performs a second congestion control different from the first congestion control, the program causing a computer to:
detect a congestion in the lower layer;
notify, from the lower layer to upper layer, the occurrence of the congestion and congestion control information related to the congestion; and
set, in the upper layer, an output rate for each of at least one congestion-related upper-layer session that is processed in the upper layer and is related to the congestion; and
retain a control rate in the lower layer, the control rate being included in the congestion control information, and a weight for each of the at least one congestion-related upper-layer session, in the upper layer, the weight indicating a priority of the congestion-related upper-layer session,
wherein the weight is dynamically set to each of the at least one congestion-related upper-layer session, based on a ratio of an output size for the congestion-related upper-layer session at time of the occurrence of the congestion.

* * * * *